(12) United States Patent
Littunen et al.

(10) Patent No.: US 12,441,820 B2
(45) Date of Patent: Oct. 14, 2025

(54) METHOD FOR MANUFACTURING THERMOPLASTIC POLY(VINYL ALCOHOL) DERIVATIVE IN A MELT STATE REACTION AND PRODUCTS THEREOF

(71) Applicant: UPM-Kymmene Corporation, Helsinki (FI)

(72) Inventors: Kuisma Littunen, Lappeenranta (FI); Harri Kosonen, Lappeenranta (FI); Janne Antila, Hämeenlinna (FI); Jaakko Rautalahti, Valkeakoski (FI); Mikko Rissanen, Espoo (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 34 days.

(21) Appl. No.: 18/391,895

(22) Filed: Dec. 21, 2023

(65) Prior Publication Data
US 2024/0124620 A1      Apr. 18, 2024

Related U.S. Application Data

(62) Division of application No. 17/434,870, filed as application No. PCT/FI2019/050225 on Mar. 18, 2019, now Pat. No. 11,897,974.

(51) Int. Cl.
*D21H 19/20* (2006.01)
*C08F 8/14* (2006.01)
(Continued)

(52) U.S. Cl.
CPC .............. *C08F 16/06* (2013.01); *C08F 8/14* (2013.01); *C09J 7/21* (2018.01); *C09J 7/401* (2018.01);
(Continued)

(58) Field of Classification Search
CPC .......... C08F 16/06; D21H 19/20; D21H 19/52
See application file for complete search history.

(56) References Cited

U.S. PATENT DOCUMENTS 2,725,372 A    11/1955   Minsk
4,517,277 A     5/1985   Lynch et al.

FOREIGN PATENT DOCUMENTS

EP    2574644 A1    4/2013
GB    1202686 A     8/1970
(Continued)

OTHER PUBLICATIONS

Doll et al., "Organogel Polymers from 10-Undecenoic Acid and Poly(vinyl acetate)", Journal of Polymers and the Environment, vol. 26, 2018; pp. 3670-3676.
(Continued)

*Primary Examiner* — Robert C Boyle
(74) *Attorney, Agent, or Firm* — CANTOR COLBURN LLP

(57) ABSTRACT

The invention relates to a method for manufacturing thermoplastic poly(vinyl alcohol) derivative in a melt state reaction and a product thereof, wherein the method thermoplastic poly(vinyl alcohol) that has been dried is heated and admixed with an organic acid anhydride that has a catenated carbon structure which ends into a vinyl group, such that a mixture is obtained which is above the melting point of the mixture, thereby causing an ester bond forming condensation reaction in a melt state, wherein at least some of the organic acid anhydride reacts with hydroxyl groups of the thermoplastic poly(vinyl alcohol), such that reaction product is formed which contains carboxylic acid residue and thermoplastic poly(vinyl alcohol) derivative which contains ester bonded pendant chains of which at least some end into vinyl groups. The invention further relates to a method for
(Continued)

manufacturing a paper substrate and a product thereof, which contains a primer layer that contains the reaction product.

6 Claims, 7 Drawing Sheets

(51) Int. Cl.
    *C08F 16/06*     (2006.01)
    *C09J 7/21*     (2018.01)
    *C09J 7/40*     (2018.01)
    *D21H 19/32*     (2006.01)
    *D21H 19/82*     (2006.01)
    *D21H 27/00*     (2006.01)
    *D21H 27/06*     (2006.01)

(52) U.S. Cl.
    CPC ............. *D21H 19/20* (2013.01); *D21H 19/32* (2013.01); *D21H 19/824* (2013.01); *D21H 27/001* (2013.01); *D21H 27/06* (2013.01); *C08F 2810/30* (2013.01); *C09J 2400/283* (2013.01)

(56) References Cited

FOREIGN PATENT DOCUMENTS

| WO | 2005071161 A1 | 8/2005 |
| WO | 2009147283 A1 | 12/2009 |
| WO | 2011104427 A1 | 9/2011 |

OTHER PUBLICATIONS

Gimenez et al., "Unsaturated modified poly(vinyl alcohol). Crosslinking through double bonds", Polymer, vol. 40, 1999; pp. 2759-2767.
International Search Report for the corresponding International Application No. PCT/FI2019/050225; International Filing Date: Mar. 18, 2019; date of Mailing: Jan. 27, 2020; 15 pages.

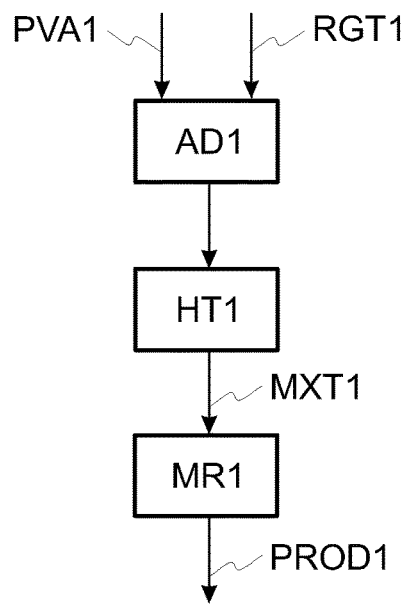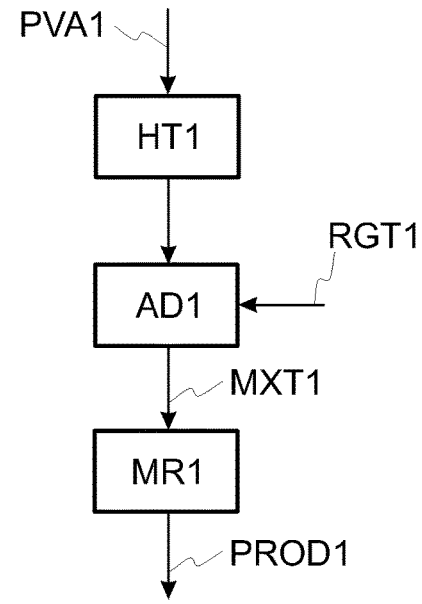
Fig. 1a    Fig. 1b
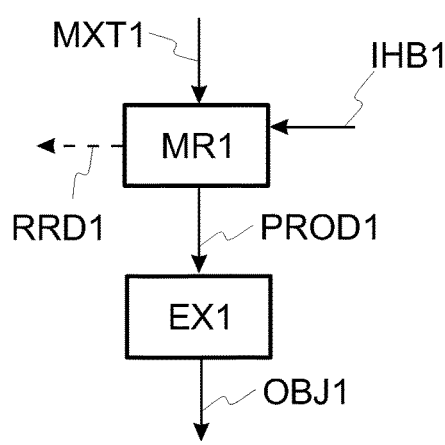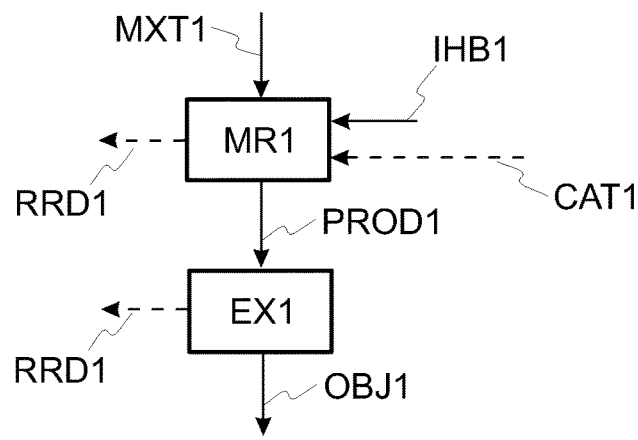
Fig. 2a    Fig. 2b

AH1

AH2

AH3

AH4

AH5

METHOD FOR MANUFACTURING THERMOPLASTIC POLY(VINYL ALCOHOL) DERIVATIVE IN A MELT STATE REACTION AND PRODUCTS THEREOF

CROSS-REFERENCE TO RELATED APPLICATIONS

This application is a divisional application of U.S. patent application Ser. No. 17/434,870, filed Aug. 30, 2021, which is a National Stage application of PCT/FI2019/050225, filed Mar. 18, 2019, the contents of both of which are incorporated by reference herein in their entirety.

TECHNICAL FIELD

The invention relates to a method for manufacturing a composition for a release liner paper substrate and products thereof. The invention further relates to a method for manufacturing composition suitable for use in a primer layer of a release liner paper substrate which is capable of binding silicone in a catalytic hydrosilation reaction and products thereof.

BACKGROUND

A release liner, as disclosed herein, refers to an industrially manufactured paper substrate that has been calendered and coated with a silicone based composition, i.e. a release coating, which is subsequently thermally cured in a catalytic hydrosilation reaction. A combination of an industrially manufactured cellulose fiber-based support layer and a primer layer refers to a paper substrate. A combination of a paper substrate and a cured silicone-based release layer refers to a release liner. The catalytic hydrosilation reaction, also denoted as hydrosilylation, refers to a covalent bond formation between functional vinyl groups in the silicone base polymer and silane hydride (Si—H) groups in the cross-linker compound in the presence of a platinum catalyst. This reaction results into a solid release layer, on the surface of the paper substrate. The solid release layer has dehesive properties. A release liner can thus be used, for example, to shield a pressure sensitive adhesive layer of a label, which is intended to be attached on an object surface. Release liners are widely used as non-blocking backing material for self-adhesive products, such as self-adhesive labels.

A release liner, as disclosed herein, contains a calendered cellulose fiber-based support layer. A calendered cellulose fiber-based support layer may be used to provide dimensionally stable and dense surface, on which a release coating may be applied. A typical cellulose fiber-based support layer suitable for use on a release liner is an industrial paper, which has been calendered. The industrial paper is generally manufactured from chemical pulp, such as bleached Kraft pulp. Examples of industrially manufactured paper that may be used for the production of a release liner are glassine paper, super calendared Kraft (SCK) paper and clay coated Kraft (CCK) paper.

The release coating is typically a silicone based composition, which is applied on the paper substrate in oily form, which release coating is then cured to form the release layer. Release coatings based on silicone compounds are typically easy to apply and well-flowing. Among various thermal curing methods, low temperature curing, referred to as "LTC", is an advantageous method for saving energy. A low temperature curing in this context refers to a catalytic hydrosilation reaction taking place at a temperature of less than 120° C., preferably in the range of 55° C. to 110° C. Release coatings based on silicone compounds are expensive. The platinum catalyst used to accomplish the catalytic hydrosilation reaction is very expensive. Due to the high cost, there is a constant effort to reduce the amount of silicone compounds and platinum required for providing a release layer. Usually, in order to get a well-cured silicone network, the cross-linker compound is used in an excess stoichiometric amount to ensure complete curing of the base polymer. This excess amount poses a problem on reeled label laminate web during storage, since due to the oily nature of the uncured cross-linker compound, at least some of the unreacted cross-linker compound can migrate through the paper substrate. Industrially manufactured paper substrates are never completely closed or impermeable and may contain some openings or pores, thereby allowing the uncured cross-linker compound to penetrate the paper substrate and reach the opposite side of the release liner, thereby contaminating the adjacent surface of the label laminate web on the reel. Upon contact with the label laminate web, the uncured cross-linker compound may smear portions of the face material surface and subsequently cause problems with printing quality, such as poor print quality control or uneven intensity of the printed surface, especially when the face material is a filmic face substrate, such as polyethylene, polypropylene, polyethylene terephthalate or a similar synthetic thermoplastic polymer, which are widely in use The paper substrate typically comprises a primer layer, which may be used to improve the properties of the paper substrate. The paper substrate surface is preferably configured to be compatible with the subsequent release coating and the thermal curing process. Poly(vinyl alcohol) (PVA) is a synthetic polymer, which has excellent film forming, emulsifying and adhesive properties. It is also relatively resistant to oil and grease. It has high tensile strength and flexibility, as well as low gas permeability. These properties may be used to provide a layer having a barrier effect, for example by coating a cellulose fiber-based support layer surface with a primer layer comprising PVA. Such primer layer is typically located in a release liner between a cellulose fiber-based support layer and a silicone based release layer. The barrier layer increases the paper surface tightness and smoothness. The barrier layer further helps to prevent uncured silicone of the release layer from migrating towards the cellulose fiber-based support layer.

While the primer layer may provide some barrier effect, the unreacted cross-linker has despite a film-forming primer layer been observed to migrate through the primer layer and to the opposite side of the paper substrate underneath the primer layer. Industrially manufactured paper substrates are never completely closed or impermeable and may contain some openings or pores, thereby allowing the uncured cross-linker compound to penetrate the paper substrate and reach the opposite side of the release liner, thereby contaminating the adjacent surface of the label laminate web on the reel.

In addition to the migration phenomenon disclosed above, another problem associated with the current release liners is the relatively low anchorage of the release layer towards the paper substrate. In line with the labelling process developments, the speed of coating machines, which are used to apply the release coating, has increased significantly. It is desirable to optimize the reaction temperature and reduce reaction time during the addition curing reaction of a release coating containing a silicone polymer, in order to improve the cost-efficiency of the coating process. Novel fast-curing silicones can have a very branched molecular structure, much more so than those of the previous generations. The branched molecular structure leads to faster reaction kinetics. Novel, fast curing silicones therefore require less time for the addition curing reaction to take place.

A problem with respect to anchorage of the silicone compounds may arise, when the amount of platinum catalyst is reduced from the current level in the range of 50 to 35 ppm to a lower level, such as to a level of 30 ppm or below, even as low as 10 ppm. The reduced amount of platinum catalyst and silicone curing time, however, should not adversely affect the relative rub-off values of the release layer, which should remain consistent over time, since a release liner may be stored for a period of time prior to its use. This sets requirements for the paper substrate, which should promote long-term stable anchorage of the silicone to the paper substrate at low platinum levels, while enabling the use of fast curing silicone compounds, which are advantageous in reducing the high-speed release values. Stable anchorage of the release layer is especially important in high-speed labelling applications. Modern labelling processes may have very high velocities, which impose challenges to the release properties of the release liner, which have not existed in the past. It is therefore of importance, that the release layer is firmly anchored to the paper substrate, such that the release liner may serve as a reliable dehesive platform in high-speed applications. Release value is used to denote the minimum amount of force required to detach a label or excess matrix material from the release liner. Modern high-speed labelling applications, which may operate at a very high velocity up to tens of thousands of labels dispensed per hour, demand that the release liner has a sufficiently low and stable high-speed release value, such that the dispensing of labels from the release liner may proceed without interruptions. The higher the velocity in a labelling process is, the smaller is the acceptable amount of deficiency in the anchorage level of the release layer towards the paper substrate. This requirement is enhanced as the base weight (grammage) of the paper used in high-speed release liner applications is decreasing, both in the paper substrates and in the face material, which may also be of paper. The reduced base weight therefore leads also to lighter label laminate web and subsequently weaker excess matrix material, which needs to be stripped away from the release liner with lower amount of force than before to avoid breaking the matrix material. The optimal anchorage level is also reflected in cost savings, as a lighter label laminate web corresponds to thinner face material. Therefore, the amount of labels produced from the same amount of face material may be increased.

Prior approaches for improving the anchorage of the release layer towards the paper substrate have focused either on a paper substrate wherein organic molecules have been grafted or on methods for producing a modified polymer that comprises vinyl groups by means of a solvent-based reaction, the solvent being either an organic solvent or water.

The publication WO 2005/071161 discloses a method of grafting organic molecules at the surface of a cellulose support. Petroleum ether is mentioned as a grafting solvent for carrying out the reaction, which takes place at the paper surface. A disadvantage associated with this method is that the reaction takes place at the paper surface and inevitably produces hydrogen halides, such as HCl, which has a negative effect on the paper surface, such as reduced paper strength and colouring. Hydrogen halides are extremely corrosive and pose a hazard also to the manufacturing equipment. For safety reasons, such a configuration is very difficult to implement on a paper mill environment.

The publication WO 2009/147283 (Example 1) discloses a functionalization of PVA with 10-undecenoyl chloride in an organic solvent (N-methyl pyrrolidone), the reaction time being 48 hours at room temperature, after which the polymer is precipitated, purified and finally dried.

The publication WO 2011/104427 discloses a functionalization of PVA in a water-based reaction with undecylenic aldehyde. The acetalization reaction requires dissolving of PVA to water, acidic conditions to initiate the reaction and a neutralizing step to stop the reaction.

The reaction in an aqueous solution is further limited by the reactant concentration. When the amount of grafting agent is higher than 2.5 wt. %, a rapid rise in solution viscosity starts to occur, which first complicates and ultimately prevents sufficient mixing of the reagents and the subsequent handling of the reaction solution. This is particularly problematic for on-line coating processes at paper mills, wherein the coating machines use pumps that require relatively low viscosity to preserve sufficient flow characteristics. The relatively low efficiency of the reaction is a drawback.

Thus, the prior approaches disclose various methods wherein either the reaction takes place at a cellulose support surface, or the PVA is dissolved into an organic solvent or water such that the functionalization of the PVA is carried out in a solution. The PVA, once functionalized, is thus in a liquid form in a solution. The solution is either neutralized with an alkaline agent or purified further with additional solvents. The disclosed methods further rely on either on-site production of the functionalized product or require handling of multiple types of liquids and/or solvents. The dissolving and functionalization of the PVA with molecules containing a vinyl group, the subsequent neutralization, separation and/or purification efforts, combined with the possible drying process increase the complexity and economical costs of the prior approaches. Further, the prior approaches have a threshold which limits the amount of vinyl groups that can be present in the functionalized PVA.

SUMMARY

The present invention relates to a method for manufacturing a reaction product which contains carboxylic acid residue and thermoplastic poly(vinyl alcohol) derivative which contain pendant chains which end into vinyl groups, without adding a solvent. More precisely, the present invention relates to a method wherein organic acid anhydride and thermoplastic poly(vinyl alcohol) that contains hydroxyl groups are arranged to react in a melt state condensation reaction. The reaction between a hydroxyl group of the thermoplastic poly(vinyl alcohol) and the organic acid anhydride in a melt state is an ester bond forming condensation, which produces carboxylic acid residue and thermoplastic poly(vinyl alcohol) derivative, which contains ester bonded pendant chains of which at least some end into vinyl groups. An organic acid anhydride, by definition, does not contain water. An aliphatic organic acid anhydride is a reagent that enables a very efficient way of performing an ester bond forming condensation reaction with the hydroxyl groups of the thermoplastic poly(vinyl alcohol). Thus, a reaction product is obtainable, which contains thermoplastic poly(vinyl alcohol) derivative having ester bonded pendant chains that end into vinyl groups and carboxylic acid residue, i.e. a carboxylic acid, that contain the same kind of chain structures that end into vinyl group as the ester bonded pendant chains. Such a method is fast and cost efficient. As the reaction does not require any organic solvent or water, the resulting reaction product does not require any solvent separation or drying, either. The reaction product, which may be simply cooled down to a solid reaction product, is easy to transport and store. The reaction is easy to implement in a reactor such as an extruder, and hence does not suffer of mixing problems, which may be present in solvent based reactions.

The present invention further relates to a solid reaction product containing such carboxylic acid residue and thermoplastic poly(vinyl alcohol) derivative. Some variations relate to a method for manufacturing a paper substrate suitable for use as a release liner substrate layer, wherein the paper substrate contains a primer layer with such reaction product. Some variations relate to a paper substrate which contains a primer layer with such reaction product. Some variations relate to use of such reaction product on a paper substrate suitable for use as a release liner substrate layer.

The present invention solves the problems referred to above by providing a reaction product that contains thermoplastic poly(vinyl alcohol) derivative comprising ester bonded pendant chains of which at least some end into vinyl groups. When the thermoplastic poly(vinyl alcohol) derivative is manufactured in a melt state reaction, the condensation reaction can be carried out without solvents. Thus, the functionalization of the poly(vinyl alcohol) with organic acid anhydride can be arranged to produce thermoplastic poly(vinyl alcohol) derivative having pendant chains of which at least some end into vinyl groups which is not in a solvent.

When the thermoplastic poly(vinyl alcohol) derivative is manufactured in a melt state reaction, the reaction can further be carried out in a high temperature, such as in the range of 170 to 210° C. A reaction in a melt state which is above the melting point of a mixture comprising molten poly(vinyl alcohol) may occur at a temperature which is significantly higher than a reaction which takes place in an organic solvent or water. The melt state reaction is an advantageous way to produce an ester bond forming condensation reaction of thermoplastic poly(vinyl alcohol), since thermoplastic poly(vinyl alcohol) is most stable in a molten state. The expression "thermoplastic poly(vinyl alcohol)" in this context refers to poly(vinyl alcohol) possessing thermoplasticity. The risk of poly(vinyl alcohol) decomposition may further be reduced by selecting a thermoplastic poly(vinyl alcohol) grade, wherein the degree of hydrolysis is sufficiently high, such as equal to or higher than 65 mol-%. However, grades that have a degree of hydrolysis equal to or higher than 90 mol-%, may be less preferable as the colouring of poly(vinyl alcohol) may also occur as a result of excessive heating, in particular when the amount of hydroxyl groups in the poly(vinyl alcohol) is very high. Preferably, when performing a melt state reaction with an organic acid anhydride, the thermoplastic poly(vinyl alcohol) has a degree of hydrolysis in the range of 65 to 90 mol-%. A degree of hydrolysis in the range of 65 to 90 mol-% also contributes to the improved thermoplasticity of poly(vinyl alcohol). When thermoplastic poly(vinyl alcohol) has a degree of hydrolysis in the range of 65 to 90 mol-%, the thermoplastic poly(vinyl alcohol) is also water soluble.

A further advantage of the melt state reaction of poly(vinyl alcohol) and organic acid anhydride is that the reaction is not dependent of the pH adjustment. Thus, acidic or alkaline agent is not needed to adjust the pH value before or after the reaction. The use of aliphatic organic acid anhydride and thermoplastic poly(vinyl alcohol) in the melt state reaction enables the formation of carboxylic acid as a reaction product, in addition to the thermoplastic poly(vinyl alcohol) derivative. Carboxylic acid is a weak acid. Therefore, the formation of strong hydrogen halides, such as HCl, may be eliminated. In a high temperature, such as in the range of 170 to 210° C., the presence of hydrogen halides in molten poly(vinyl alcohol) may promote polyene formation, which may promote polyene formation, which is a degradation reaction of PVA. The onset of polyene formation may be observed visually as colouring of the reaction product. Hydrogen halides, further, are very corrosive substances, which may easily damage the equipment used to produce the thermoplastic poly(vinyl alcohol) derivative.

A melt state reaction may also be used to avoid a purification of the reaction product of added solvents. In particular, when manufacturing the thermoplastic poly(vinyl alcohol) derivative from thermoplastic poly(vinyl alcohol) having hydroxyl groups and wherein the thermoplastic poly(vinyl alcohol) has been dried, there is no need to dissolve the thermoplastic poly(vinyl alcohol) prior to the condensation reaction, which reduces the time required for the manufacturing process. The thermoplastic poly(vinyl alcohol), once dried, may simply be heated and admixed with a reagent, which is an organic acid anhydride that has a catenated carbon structure which ends into a vinyl group, such that a mixture is obtained, which is above the melting point of the mixture, thereby causing a reaction in a melt state, wherein at least some of the organic acid anhydride reacts with hydroxyl groups of the thermoplastic poly(vinyl alcohol), such that reaction product is formed.

Due to the melt state reaction without additional solvents, the reaction volume may be kept small, which simplifies manufacturing process. The melt state reaction of a mixture, which contains molten thermoplastic poly(vinyl alcohol) having hydroxyl groups and organic acid anhydride which contains chains which end into vinyl groups, may be carried out in a reactor such as an extruder or a hot-cold mixer. This is advantageous, since such reactors, extruders in particular, are designed to produce high shear forces, which promote efficient mixing of the participating compounds and thereby have an effect to the melt viscosity. The thermoplastic poly(vinyl alcohol) derivative may have a melt flow index in a range of 0.5-300 g/10 min, when measured with standard ISO 1133 (210° C., 2.16 kg). At higher shear forces, the risk of intra- and inter-chain hydrogen bond formation to the poly(vinyl alcohol) and its derivative is reduced. The method, when carried out in such a reactor, therefore enables a reaction in a melt state wherein the amount of the reagent is in the range of 1 to 10 wt.-%, more preferably in the range of 3 to 6 wt.-%, when determined of the total weight of the mixture. Thereby, thermoplastic poly(vinyl alcohol) derivative may be obtained, which contains a vinyl group molality $b_{vin}$ which is equal to or higher than 0.01 millimoles per gram of the thermoplastic poly(vinyl alcohol) derivative, preferably equal to or higher than 0.03 millimoles per gram of the thermoplastic poly(vinyl alcohol) derivative, when determined by iodometric titration method following the standard ISO 3961:2009(E). The method for manufacturing the poly(vinyl alcohol) derivative, when carried out in such a reactor, further enables a short duration of the reaction in a melt state, which may be less than 5 minutes or less, preferably 1 minute or less, most preferably 20 seconds. The duration of the reaction may vary, depending of the reactor type and used parameters.

The method for manufacturing the poly(vinyl alcohol) derivative results into a reaction product, which may be extruded and cooled, such that the temperature of the reaction product decreases and a solid reaction product is obtained. The method does not necessitate separation of the reaction product from a solvent. The solid reaction product may be shaped into compact form which is suitable for transportation, such as into granulates. The reaction product is easy to store and transport to various places. This enables a centralized manufacturing of the reaction product, for example at a facility specialized to manufacture polymer products.

The solid reaction product is stable and may be used for various purposes, such as in a coating composition which is intended to be applied on a cellulose fiber-based support to form a paper substrate having a primer layer. Preferably, both the thermoplastic poly(vinyl alcohol) having a degree of hydrolysis in the range of 65 to 90 mol-%, and the formed thermoplastic poly(vinyl alcohol) derivative having a degree of hydrolysis in the range of 60 to 90 mol-%, preferably in the range of 65 to 90 mol-%, are water soluble. The expression 'water soluble' in this context means that a solution, wherein the thermoplastic poly(vinyl alcohol) or the thermoplastic poly(vinyl alcohol) derivative has been dissolved, is obtainable within 24 hours after mixing the thermoplastic poly(vinyl alcohol) or solid reaction product, respectively, with deionized water in at least 1:10 ratio (weight/weight) while continuously stirring at a temperature in the range of 40 to 80° C. Depending on the used temperature and the shape and the size of the material, the time for obtaining a solution may vary. A smaller particle size and higher temperature may be used to reduce the time to obtain a solution. When the formed thermoplastic poly(vinyl alcohol) derivative is water soluble, the reaction product may be transported in a compact, solid form to a paper mill. The reaction product and/or the thermoplastic poly(vinyl alcohol) derivative therein may thus be dissolved, when needed, and/or diluted with water and/or admixed with other coating composition components, when desired. This enables a formation of a coating composition at a time when the paper substrate is manufactured.

The present invention thus enables a new approach to shorten the reaction time of grafting PVA. The present invention further enables a reaction without added solvents, which minimize harmful by-products during the reaction. The present invention further provides a simplified method for producing a thermoplastic poly(vinyl alcohol) derivative which contains pendant chains which end into vinyl groups. Due to the melt state reaction conditions, the reaction efficiency may be improved considerably. The method enables a small reaction volume, which still results to a high yield of thermoplastic poly(vinyl alcohol) derivative which contains ester bonded pendant chains which end into vinyl groups.

A method is provided for manufacturing thermoplastic poly(vinyl alcohol) derivative which contains pendant chains which end into vinyl groups, the method comprising:
heating thermoplastic poly(vinyl alcohol) having hydroxyl groups, wherein the thermoplastic poly(vinyl alcohol) has been dried and has a degree of hydrolysis in the range of 65 to 90 mol-%, and
admixing reagent with the thermoplastic poly(vinyl alcohol), wherein said reagent is an organic acid anhydride having at least a chain which has a catenated carbon structure of at least 4 carbon atoms and which ends into a vinyl group,
such that a mixture is obtained which contains molten thermoplastic poly(vinyl alcohol) having hydroxyl groups and organic acid anhydride which contains chains which end into vinyl groups, and
mixing the mixture at a temperature which is above the melting point of the mixture, thereby causing a reaction in a melt state, wherein at least some of the organic acid anhydride reacts with the hydroxyl groups of the thermoplastic poly(vinyl alcohol) in an ester bond forming condensation reaction,
such that reaction product is formed which contains
carboxylic acid residue of the ester bond forming condensation reaction, wherein at least some of said carboxylic acid residue contains chains which end into vinyl groups, and
thermoplastic poly(vinyl alcohol) derivative which contains ester bonded pendant chains of which at least some end into vinyl groups.

If desired, the method may further comprise adding inhibitor suitable for inhibiting spontaneous radical polymerization of vinyl groups, such as butylated hydroxytoluene. Further the method may further comprise adding catalyst suitable for catalysing the ester bond forming condensation reaction, such as 1-methylimidazole. The inhibitor and/or the catalyst may be added before mixing the mixture or when mixing the mixture.

If desired, the method may further comprise removing at least part of the carboxylic acid residue from the reaction product during and/or after the condensation reaction, for example by means of evaporation, thereby obtaining recyclable carboxylic acid residue. At least some of the recyclable carboxylic acid residue may be arranged in reaction wherein organic acid anhydride is formed, thereby arranging at least partial recycling of the reagent.

The method may further comprise extruding and cooling the reaction product, such that the temperature of the reaction product decreases and a solid reaction product is obtained, and shaping the solid reaction product into compact form which is suitable for transportation, such as into granulates. Of notice is, that an ester bond forming condensation reaction of an organic acid anhydride always leads to the formation of carboxylic acid residue, which is thus present in the reaction product. This may be determined from the reaction product, for example, by means of gas chromatography, after first separating the carboxylic acid residue and the thermoplastic poly(vinyl alcohol) derivative into two separate phases, for example by means of heptane extraction, and then evaporating the heptane. The produced carboxylic acid residue is typically a carboxylic acid with weaker acidity. When compared to the hydrogen halides produced with organic halides in solvent based reactions, the presence of a carboxylic acid residue is a clear improvement. If desired, at least some of the carboxylic acid residue in the reaction product may be neutralized with an alkaline reagent, such as NaOH, thereby forming a salt of the carboxylic acid residue, i.e. a carboxylate.

According to another aspect, the present invention provides a solid reaction product that contains thermoplastic poly(vinyl alcohol) derivative comprising ester bonded pendant chains of which at least some end into vinyl groups, wherein the pendant chains which end into vinyl groups contain a catenated carbon structure of at least 4 carbon atoms, the solid reaction product further comprising carboxylic acid residue, wherein the carboxylic acid residue is organic compound that contains the same kind of catenated carbon structures that end into vinyl group as the pendant chains of the thermoplastic poly(vinyl alcohol) derivative. The composition of the carboxylic acid residue may vary depending of the symmetricity of the organic acid anhydride used as a reagent. The reaction product may have a melting point in a range of 170 to 210° C.

The amount and chemical composition of carboxylic acid residue may vary in the solid reaction product, depending of the admixed organic acid anhydride which reacts with the thermoplastic poly(vinyl alcohol) in the ester bond forming condensation reaction. Further, some of the carboxylic acid residue may be capable to react with the molten thermoplastic poly(vinyl alcohol). The presence of the carboxylic acid residue may be determined from solid reaction product, after the carboxylic acid residue and the thermoplastic poly(vinyl alcohol) derivative have been first separated into two separate phases, for example by means of dissolving a small amount of the solid reaction product into distilled water and performing a heptane extraction, whereby the carboxylic acid residue may be extracted into the heptane phase, since heptane is able to dissolve fatty acids and is not miscible with water. The acid residue is also easily recoverable from heptane by evaporation. After having evaporated the heptane, the presence of the carboxylic acid residue may be determined for example by means of gas chromatography.

The melting point of the solid reaction product may be determined, for example, by means of differential scanning calorimetry (DSC). The reaction product, when arranged to be in the form of a solid concentrate, is stable, compact and easy to transport globally and store despite conditions. It may be later dissolved and/or diluted to desired/needed concentrations for versatile applications. The solid reaction product may be used as a coating composition. The reaction product, either in solid form or when dissolved, may also be mixed with other coating composition materials, when needed. The amount of the thermoplastic poly(vinyl alcohol) derivative of the reaction product may be, for example, in a range of 80-99.9 wt.-% of the reaction product.

The reagent in the method may be an organic acid anhydride, which is aliphatic and either a symmetrical anhydride or an asymmetrical anhydride having at least one acyl group which has a catenated carbon structure of at least 4 carbon atoms and which ends into a vinyl group. Preferably, the catenated carbon structure contains 5 or more, preferably at least 9, most preferably from 10 to 18 carbon atoms. Preferably, the organic acid anhydride is a fatty acid-based anhydride, which may contain one acyl group or two acyl groups derived from 3-butenoic acid, 2,2'-dimethyl-4-pentenoic acid, 4-pentenoic acid, 7-ocenoic acid, 8-nonenoic acid, 10-decenoic acid, or 12-tridecenoic acid. As an example, the reagent may be undecenoyl anhydride, which is a symmetrical anhydride comprising two identical acyl groups derivable from 10-undecenoic acid, each acyl group having a vinyl group at the end. The aliphatic anhydride used as a reagent in the method may be manufactured, for example, by reacting a carboxylic acid salt which has a catenated carbon structure of at least 4 carbon atoms and which ends into a vinyl group with an acyl chloride. The carboxylic acid salt may be, for example, a sodium carboxylate. Alternatively, the reagent may be obtained by reacting acetic anhydride with a carboxylic acid which has a catenated carbon structure of at least 4 carbon atoms and which ends into a vinyl group. If desired, the acetic anhydride may be reacted with a mixture of carboxylic acids, instead, thereby obtaining a heterogeneous reagent, which contains more than one kind of aliphatic anhydrides, at least some of which have a catenated carbon structure of at least 4 carbon atoms and which end into a vinyl group.

According to yet another aspect, there is provided a paper substrate which is suitable for binding silicone in a catalytic hydrosilation reaction, the paper substrate comprising
  a cellulose fiber-based support layer and
  a primer layer which contains thermoplastic poly(vinyl alcohol) derivative which contains ester bonded pendant chains of which at least some end into vinyl groups,
wherein the ester bonded pendant chains that end into vinyl groups contain a catenated carbon structure of at least 4 carbon atoms, the primer layer further comprising carboxylic acid residue and/or salt of said carboxylic acid residue, and wherein the carboxylic acid residue and/or the salt of said carboxylic acid residue is an organic compound that contains the same kind of catenated carbon structure of at least 4 carbon atoms that end into vinyl group as the ester bonded pendant chains.

According to yet another aspect, there is provided a method for manufacturing a paper substrate which is suitable for binding silicone in a catalytic hydrosilation reaction, the method comprising:
  heating thermoplastic poly(vinyl alcohol) having hydroxyl groups, wherein the thermoplastic poly(vinyl alcohol) has been dried and has a degree of hydrolysis in the range of 65 to 90 mol-%, and
  admixing reagent with the thermoplastic poly(vinyl alcohol), wherein said reagent is an organic acid anhydride having at least a chain which has a catenated carbon structure of at least 4 carbon atoms and which ends into a vinyl group, such that a mixture is obtained which contains molten thermoplastic poly(vinyl alcohol) having hydroxyl groups and organic acid anhydride which contains chains which end into vinyl groups, and
  mixing the mixture at a temperature which is above the melting point of the mixture, thereby causing a reaction in a melt state, wherein at least some of the organic acid anhydride reacts with the hydroxyl groups of the thermoplastic poly(vinyl alcohol) in an ester bond forming condensation reaction,
such that reaction product is formed which contains
  carboxylic acid residue of the ester bond forming condensation reaction, wherein at least some of said carboxylic acid residue contains chains which end into vinyl groups, and
  thermoplastic poly(vinyl alcohol) derivative, which contains ester bonded pendant chains of which at least some end into vinyl groups, and
  coating at least one side of a cellulose fiber-based support layer with a coating composition that contains the reaction product,
thereby forming a paper substrate with a primer layer that contains thermoplastic poly(vinyl alcohol) derivative which contains ester bonded pendant chains of which at least some end into vinyl groups, wherein the pendant chains which end into vinyl groups contain a catenated carbon structure of at least 4 carbon atoms, the primer layer further comprising carboxylic acid residue, wherein the carboxylic acid residue is an organic compound that contains the same kind of catenated carbon structure of at least 4 carbon atoms that end into vinyl group as the pendant chains of the thermoplastic poly(vinyl alcohol) derivative,
the paper substrate thereby being suitable for binding silicone in a catalytic hydrosilation reaction.

Preferably, the paper substrate is an industrial paper, which has been calendered. The calendaring treatment may comprise use of a calender, a multi-nip calender and/or a super calender to modify the surface properties of the paper and/or to reach a final thickness for the paper. Such calendered paper substrate may be used as a layer of a release liner. Preferably, the cellulose fiber-based support layer is glassine paper, super calendared Kraft (SCK) paper or clay coated Kraft (CCK) paper. Preferably, the paper substrate has a smoothness of at least 900 sec/min (according to ISO 5627), and/or a density of at least 1.0, such as in the range of 1.0 to 1.2, wherein the density refers to grammage (ISO 536) per thickness (according to ISO 534), and/or a porosity equal to or less than 15000 pm/Pas (according to ISO 11004) and/or a transparency of equal to or higher than 40%, preferably equal to or higher than 44% when the paper grammage is less than 70 g/m$^2$, or equal to or higher than 28%, preferably equal to or higher than 33% when the paper grammage is equal to or higher than 70 g/m$^2$ (according to ISO 2470).

The reaction product may be stored as a solid reaction product, prior to use in a coating composition. The reaction product, either in solid form or when dissolved, may also be mixed with other coating composition materials. Thus, coating of at least one side of a cellulose fiber-based support layer may be performed with the reaction product or an aqueous solution of the reaction product, which has been formed of the solid reaction product.

The vinyl group-containing carboxylic acid residue obtainable from the ester bond forming condensation reaction between an organic acid anhydride and a thermoplastic poly(vinyl alcohol) having hydroxyl groups has been observed to act as a surfactant on a paper substrate. This effect has been observed even when some of the carboxylic acid residue on the primer layer has been neutralized into the corresponding carboxylate, i.e. the salt of said carboxylic acid residue. The carboxylic acid residue, when arranged on a primer layer of a paper substrate, may be configured to improve the spreading of a subsequent silicone based composition applicable as a release coating on the paper substrate. The reaction product of the ester bond forming condensation reaction in a melt state may therefore be used to obtain a paper substrate having improved surface characteristics.

Further advantages of the above-disclosed methods and products thereof will be explained in more detail in the following description with reference to the following figures.

BRIEF DESCRIPTION OF THE DRAWINGS

FIGS. 1a and 1b illustrate, by way of examples, a method for manufacturing thermoplastic poly(vinyl alcohol) derivative in a melt state reaction;

FIGS. 2a and 2b illustrate, by way of examples, optional features in a method for manufacturing thermoplastic poly(vinyl alcohol) derivative in a melt state reaction;

The symbols $S_x$ and $S_z$ in the figures represent orthogonal directions, which are perpendicular to each other. The figures are illustrative and meant to provide better understanding of the underlying invention. The figures have not been drawn into any specific scale.

DETAILED DESCRIPTION

Thermoplastic Poly(Vinyl Alcohol) and Organic Acid Anhydride

In this context, thermoplastic poly(vinyl alcohol) refers to poly(vinyl alcohol) which has hydroxyl groups and a degree of hydrolysis in the range of 65 to 90 mol-%. A degree of hydrolysis, also denoted as saponification, indicates in this context the molar percentage of the acetyl groups of the poly(vinyl acetate) that have been hydrolysed to hydroxyl groups, when producing the poly(vinyl alcohol). A degree of hydrolysis of 100 mol-% would mean, therefore, that the poly(vinyl alcohol) has no acetyl groups. Thermoplastic poly(vinyl alcohol), as used herein, refers to poly(vinyl alcohol) possessing thermoplasticity. A thermoplastic poly(vinyl alcohol) may be processed in a melt state. The melt state processability of thermoplastic poly(vinyl alcohol) may be used to reduce the surface porosity of a paper substrate. A degree of hydrolysis in the range of 65 to 90 mol-% contributes to improved thermoplasticity of poly(vinyl alcohol). Fully hydrolysed poly(vinyl alcohol), such as poly(vinyl alcohol) having a degree of hydrolysis of more than 95 mol-% is less desirable, since with fully hydrolysed poly(vinyl alcohol) the melting point temperature is close to the decomposition point temperature, which renders the processing of the poly(vinyl alcohol) in a melt state less feasible. Furthermore, in fully hydrolysed poly(vinyl alcohol), heat treatment tends to produce an increase in crystallization, which, in turn, impairs their solubility in water. The reduced water solubility may impair the end use of the product, where the product is advantageously dissolved in water, when providing a coating composition for a cellulose fiber based support layer.

Thermoplastic poly(vinyl alcohol) which has been dried, in this context, refers to dry thermoplastic poly(vinyl alcohol) PVA1, that is, to material which has been dried prior to use, such that the moisture content of the material, upon intended use, is less than 2 wt.-%, preferably less than 1 wt.-%, such as less than 0.5 wt.-%, preferably less than 0.1-wt. % or most preferably less than 0.01 wt.-%. Commercially available thermoplastic poly(vinyl alcohol) grades may absorb moisture from the air, once the package has been opened. To obtain dry thermoplastic poly(vinyl alcohol), conventional methods for removing moisture may be used, such as circulating-air dryer. A typical drying time of thermoplastic poly(vinyl alcohol) PVA1 may be for 6-8 hours at a temperature in the range of 60° C.-80° C. The moisture content of the thermoplastic poly(vinyl alcohol) PVA1 may be determined shortly before use, for example by using an infrared moisture analyser.

Figure 6:
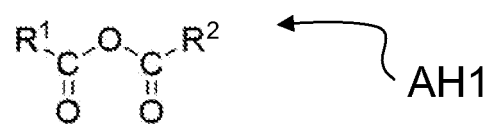
FIG. 6 illustrates, by way of examples, a general formula and some variations of an organic acid anhydride having at least one acyl group which has a catenated carbon structure of at least 4 carbon atoms and which ends into a vinyl group, which are suitable for use as a reagent in a method for manufacturing thermoplastic poly(vinyl alcohol) derivative by a melt state reaction.
Figure 6:
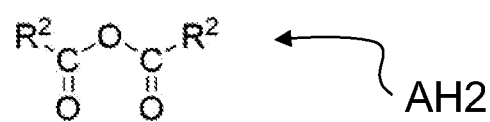
Figure 6:
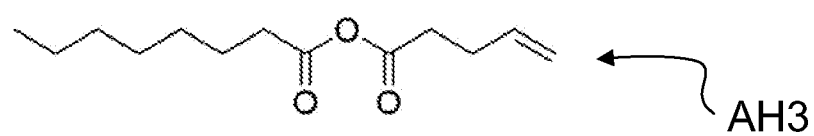
Figure 6:
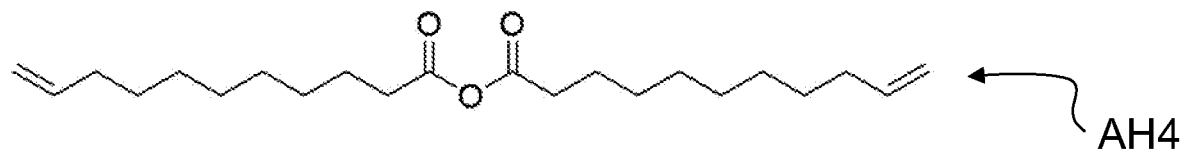
Figure 6:
Figure 7:
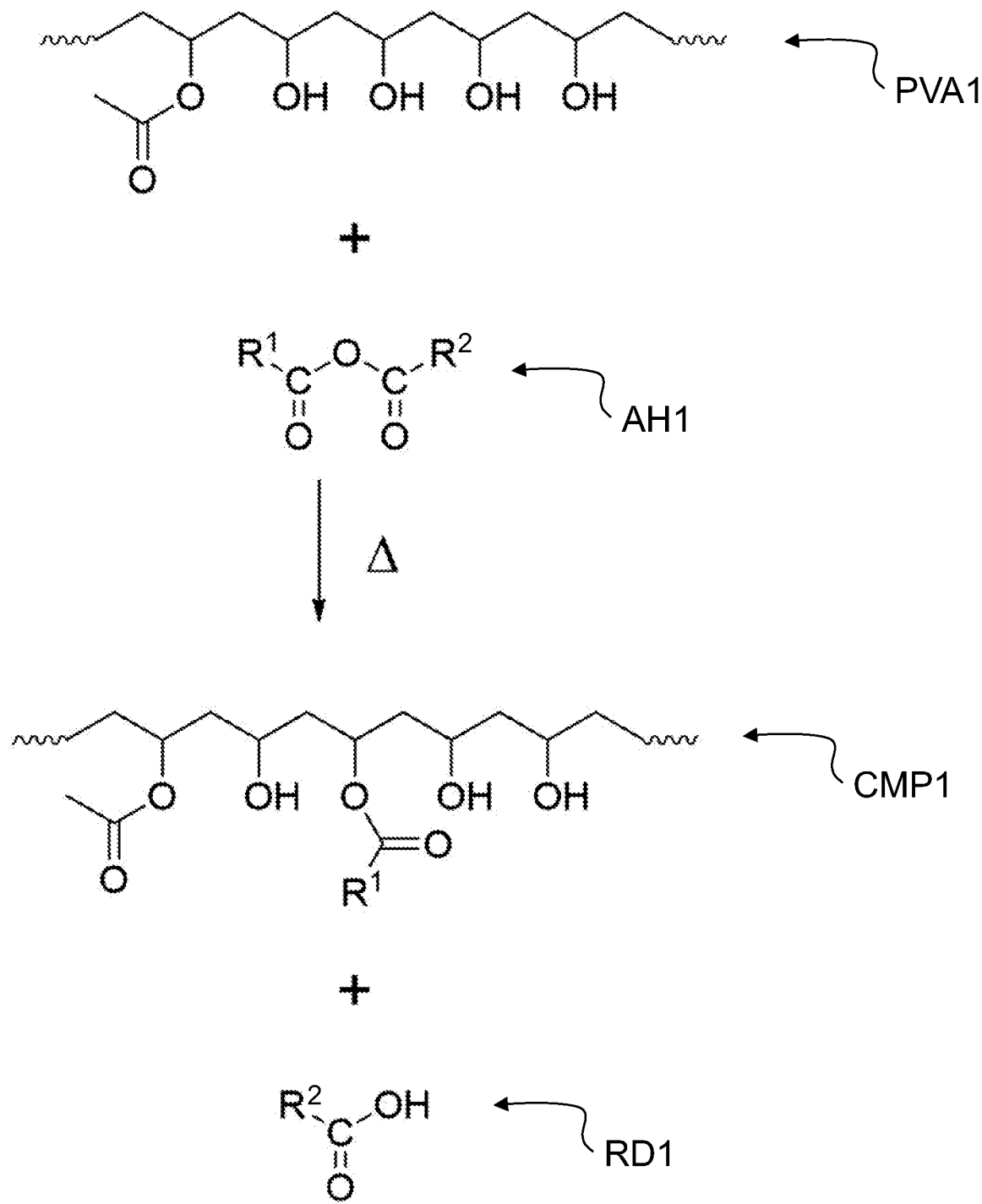
FIG. 7 illustrates, by way of an example, an ester bond forming condensation reaction between an organic acid anhydride and thermoplastic poly(vinyl alcohol) in a melt state, wherein at least some of the organic acid anhydride reacts with the hydroxyl groups of the thermoplastic poly(vinyl alcohol) in an ester bond forming condensation reaction, such that reaction product is formed which contains carboxylic acid residue and thermoplastic poly(vinyl alcohol) derivative, wherein at least some of said carboxylic acid residue contains chains which end into vinyl groups, and at least some of the ester bonded pendant chains end into vinyl groups.
Figure 8:
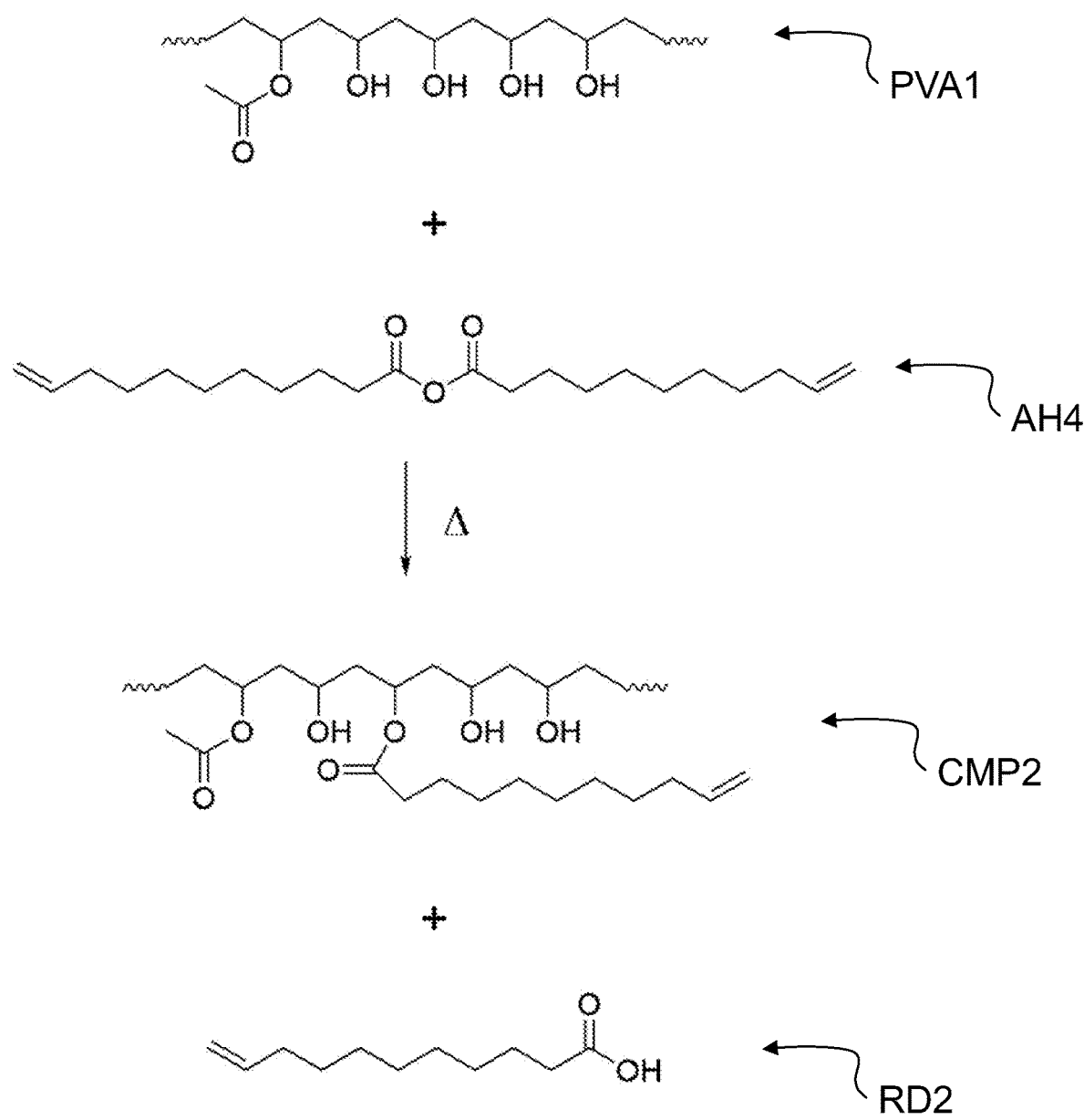
FIG. 8 illustrates, by way of an example, an ester bond forming condensation reaction between undecenoyl anhydride, which is a symmetrical anhydride comprising two identical acyl groups derivable from 10-undecenoic acid, each acyl group having a vinyl group at the end, and thermoplastic poly(vinyl alcohol) in a melt state, wherein at least some of the undecenoyl anhydride reacts with the hydroxyl groups of the thermoplastic poly(vinyl alcohol) in an ester bond forming condensation reaction, such that reaction product is formed which contains 10-undecenoic acid residue and thermoplastic poly(vinyl alcohol) derivative, wherein at least some of the ester bonded pendant chains end into vinyl groups.
Figure 9:
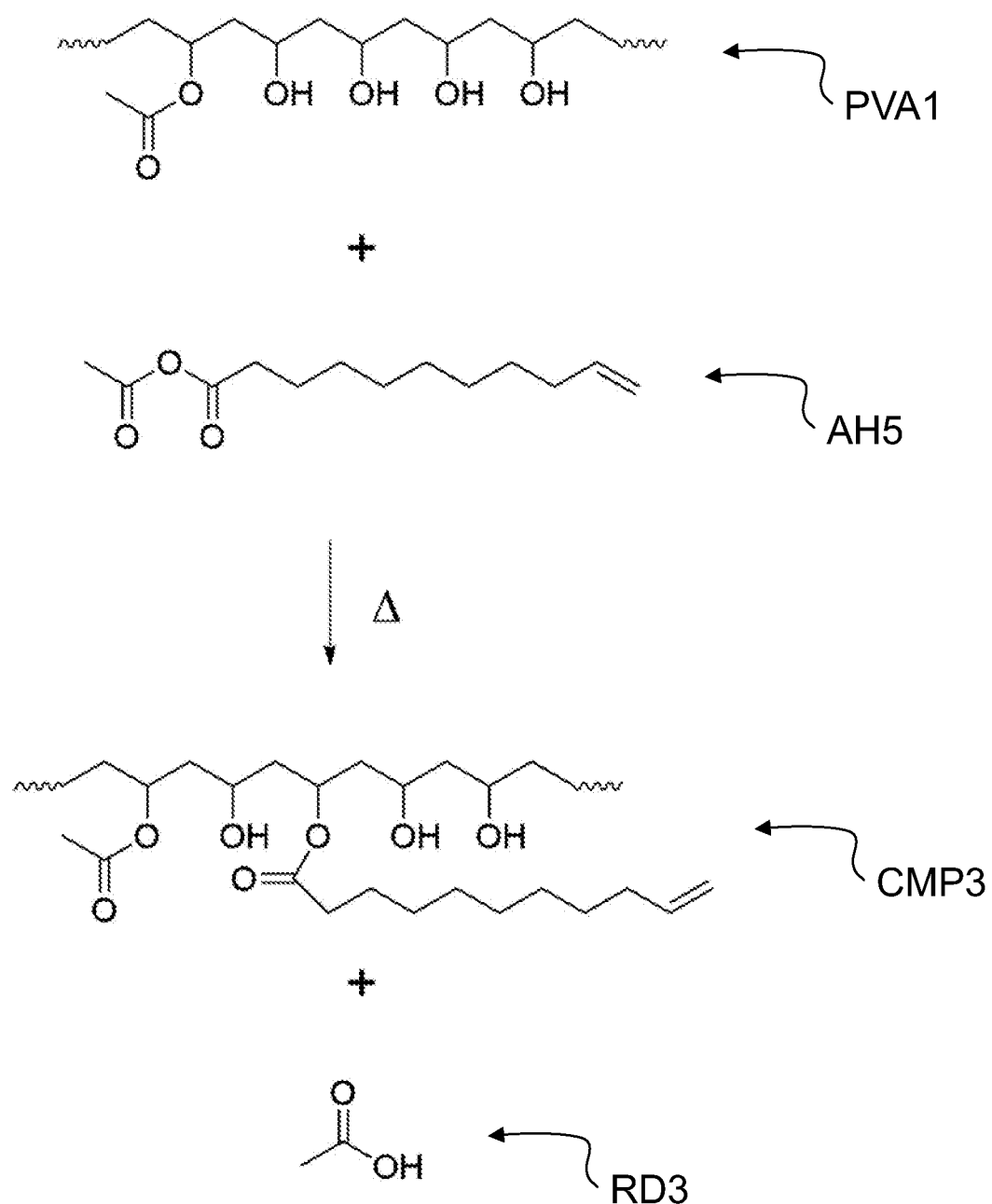
FIG. 9 illustrates, by way of an example, an ester bond forming condensation reaction between acetylundecenoyl anhydride, which is an asymmetrical anhydride comprising one acyl group derivable from 10-undecenoic acid having a vinyl group at the end; the other acyl group being derivable from acetic acid, and thermoplastic poly(vinyl alcohol) in a melt state, wherein at least some of the acetylundecenoyl anhydride reacts with the hydroxyl groups of the thermoplastic poly(vinyl alcohol) in an ester bond forming condensation reaction, such that reaction product is formed which contains acetic acid residue, 10-undecenoic acid residue and thermoplastic poly(vinyl alcohol) derivative, wherein at least some of the ester bonded pendant chains end into vinyl groups.

An organic acid anhydride refers to an organic compound that has two acyl groups bonded to the same oxygen atom. An organic acid anhydride that participates into an ester bond forming condensation reaction should have an acyl group which has a catenated carbon structure having a carbon chain length of at least 4 carbon atoms that ends into a vinyl group. This acyl group may thereby form an ester bond with a hydroxyl group of a thermoplastic poly(vinyl alcohol) in a condensation reaction. A catenated carbon structure having a chain length of less than 4 carbon atoms in the organic acid anhydride hydrocarbon chain is not suitable, as the short chain length may lead to interference with the thermoplastic polyvinyl alcohol during the ester bond forming condensation reaction. Preferably, the catenated carbon structure contains 5 or more, preferably at least 9, most preferably from 10 to 18 carbon atoms. A longer chain length is not desirable, as it may lead to chain folding problems during or after the ester bond forming condensation reaction. The organic acid anhydride may be aliphatic and a symmetrical anhydride or an asymmetrical anhydride. A symmetrical anhydride, as used herein, refers to an anhydride which has two identical acyl groups, each acyl group ending into a vinyl group. An asymmetrical anhydride, as used herein, refers to an anhydride which has non-identical acyl groups, of which at least one acyl group ends into a vinyl group. As shown in FIG. 6, in an asymmetrical anhydride AH1; AH3; AH5, the two acyl groups of the anhydride are different. In a symmetrical anhydride AH2; AH4, the two acyl groups of the anhydride are identical. The symbols $R^1$ and $R^2$, each alone, represents a functional group, of which at least one or both have a catenated carbon structure having a carbon chain length of at least 3 carbon atoms that ends into a vinyl group. As illustrated in FIGS. 7, 8 and 9, when an aliphatic organic acid anhydride AH1; AH2; AH3; AH4; AH5 reacts in a condensation reaction in a melt state with a hydroxyl group of thermoplastic poly(vinyl alcohol) PVA1, one of the acyl groups forms an ester bond with the hydroxyl group of the poly(vinyl alcohol) PVA1, while the other acyl group becomes a carboxylic acid residue RD1; RD2; RD3. The formed thermoplastic poly(vinyl alcohol) derivative CMP1; CMP2; CMP3 thereby comprises ester bonded pendant chains of which at least some end into vinyl groups, wherein the pendant chains which end into vinyl groups contain a catenated carbon structure of at least 4 carbon atoms. Statistically, it is equally likely for either or the acyl groups of the aliphatic anhydride to participate in the ester bond forming condensation reaction. Thus, also the carboxylic acid residue RD1; RD2; RD3 is an organic compound that contains the same kind of catenated carbon structure of at least 4 carbon atoms that end into vinyl group, as the ester bonded pendant chains of the thermoplastic poly(vinyl alcohol) derivative CMP1; CMP2; CMP3.

The organic acid anhydride used as a reagent in the method may be manufactured, for example, by reacting a carboxylic acid salt which has a catenated carbon structure of at least 4 carbon atoms and which ends into a vinyl group with an acyl chloride. The carboxylic acid salt may be, for example, a sodium carboxylate. Alternatively, the reagent may be obtained by reacting acetic anhydride with a carboxylic acid which has a catenated carbon structure of at least 4 carbon atoms and which ends into a vinyl group. If desired, the acetic anhydride may be reacted with a mixture of carboxylic acids, instead, thereby obtaining a heterogeneous reagent, which contains more than one kind of aliphatic anhydrides, at least some of which have a catenated carbon structure of at least 4 carbon atoms and which end into a vinyl group. An exemplary way of manufacturing aliphatic, organic acid anhydride is a continuous counter-current process performed in a fractionating column, wherein aliphatic acid entering the column near the top is flowed down the column and thus arranged to counter an ascending stream of acetic anhydride vapor introduced from the bottom of the column. When the two compounds encounter each other, the aliphatic acid is converted to the corresponding anhydride, while the acetic anhydride vapor rising through the column is converted to acetic acid. The aliphatic acid anhydride formed in the reaction may be collected from the bottom of the column by distillation. By selecting the aliphatic acid to contain a catenated carbon structure of at least 4 carbon atoms and which ends into a vinyl group, the same kind of catenated carbon structures of at least 4 carbon atoms that end into vinyl group may be introduced into the formed acid anhydride.

A catenated carbon structure is used to denote a series of bonded carbon atoms, wherein the carbon atoms are bonded to other carbon atoms. Carbon is known to be suitable for catenation, which herein refers to the formation of chain having interconnecting carbon-carbon bonds. Catenated carbon structures may also be referred to as catenae. A catenated carbon structure in this context includes a hydrocarbon chain. A catenated carbon structure may also comprise substituents, such as oxygen, hydrogen or alkane or alkene groups, such as a vinyl group. The catenated carbon structure may have 4 or more interconnecting carbon atoms in a series. The catenated carbon structure may be branched. Preferably, the catenated carbon structure is a hydrocarbon chain having at least 7 carbon atoms, more preferably 11 carbon atoms, and which ends into a functional vinyl group.

A Method for Manufacturing Thermoplastic PVA Derivative in a Melt State

Reference is made to FIGS. 1*a*, 1*b*, which illustrate, by way of examples, a method for manufacturing a thermoplastic poly(vinyl alcohol) derivative that contains ester bonded pendant chains which end into a vinyl group. Reference is further made to FIG. 6, which illustrates organic acid anhydrides which are suitable for use as a reagent in said method. Reference is further made to FIGS. 7 to 9, which illustrate, by way of examples, ester bond forming condensation reaction between an organic acid anhydride and thermoplastic poly(vinyl alcohol) in a melt state, wherein heat Δ provided to the system causes the reaction to take place. A melt state condensation reaction of organic acid anhydride AH1; AH2; AH3; AH4; AH5 and thermoplastic poly(vinyl alcohol) PVA1 that contains hydroxyl groups may be provided by heating HT1 solid thermoplastic poly(vinyl alcohol) PVA1 having hydroxyl groups, wherein the thermoplastic poly(vinyl alcohol) PVA1 has been dried and has a degree of hydrolysis in the range of 65 to 90 mol-%. By admixing AD1 reagent RGT1, which is organic acid anhydride AH1; AH2; AH3; AH4; AH5, with the thermoplastic poly(vinyl alcohol) PVA1 such that a mixture MXT1 is obtained at a temperature which is above the melting point of the mixture MXT1, a reaction in a melt state may be arranged, wherein at least some of the organic acid anhydride AH1; AH2; AH3; AH4; AH5 reacts with the hydroxyl groups of the thermoplastic poly(vinyl alcohol) PVA1 in an ester bond forming condensation reaction. Mixing MR1 the mixture MXT1 at a temperature which is above the melting point of the mixture MXT1 facilitates the reaction rate and better mixing. Typically, a temperature in a range of 170 to 210° C. may be used for the condensation reaction. The suitable temperature range is limited from the lower end by the melting point of the thermoplastic poly(vinyl alcohol) PVA1 and the mixture MXT1. The suitable temperature range is limited from the upper end by the decomposition temperature of the poly(vinyl alcohol) PVA1 and/or its derivative CMP1; CMP2; CMP3. Preferably the temperature during the condensation reaction in a melt state is in a range of 170 to 210° C. Most preferably, said temperature is in a range of 170 to 190° C., which reduces the likelihood of thermal decomposition of the thermoplastic poly(vinyl alcohol) PVA1 and/or its derivative CMP1; CMP2; CMP3. The reaction in a melt state is preferably carried out without adding a solvent. The lack of added solvents enables a small reaction volume. The lack of solvents and acid halides in the reaction in a melt state further avoids formation of corrosive residues such as HCl into the reaction product.

When the reagent RGT1 is an organic acid anhydride AH1; AH2; AH3; AH4; AH5 having at least a chain which has a catenated carbon structure of at least 4 carbon atoms and which ends into a vinyl group, reaction product PROD1 may be formed which contains carboxylic acid residue RD1; RD2; RD3 of the ester bond forming condensation reaction, wherein at least some of said carboxylic acid residue contains chains which end into vinyl groups, and thermoplastic poly(vinyl alcohol) derivative CMP1; CMP2; CMP3 which contains ester bonded pendant chains of which at least some end into vinyl groups. As also illustrated in FIG. 1a, the thermoplastic poly(vinyl alcohol) which has been dried PVA1 may be first admixed AD1 with reagent RGT1. However, as illustrated in FIG. 1b, it is also possible to first arrange the heating HT1 of the thermoplastic poly(vinyl alcohol) which has been dried PVA1 and then arrange the admixing AD1 with the reagent RGT1. The heating HT1 followed by admixing AD1 is preferable, since this facilitates to form homogenously molten thermoplastic poly(vinyl alcohol) PVA1. Even quality of the molten thermoplastic poly(vinyl alcohol) PVA1 is desirable to ensure good conditions for the ester bond forming condensation reaction.

The heating HT1 of thermoplastic poly(vinyl alcohol) PVA1 prior to admixing AD1 further facilitates an increased reaction rate as well as plasticity which contributes better mixing MR1, thereby improving the production efficiency.

As an example, a simple industrial extruder may have a capacity to produce up to 1000 kg of reaction product PROD1 in an hour. The duration of the reaction in a melt state may be less than 5 minutes, preferably less than 1 minute, more preferably less than 20 seconds. the duration including the heating HT1 of the thermoplastic poly(vinyl alcohol) PVA1 and the forming of the reaction product PROD1. The mixing MR1 is carried out in a reactor. This is also the step when the reaction in a melt state takes place. The mixing may be carried out in an extruder or in a hot-cold mixer, which conveniently provides sufficient energy for the heating HT1 and/or sufficient shearing force for the mixing MR1. When manufacturing a reaction product PROD1 in an extruder in a melt state, the viscosity of the reaction may be easily controlled, even with high amounts of reagent RGT1 admixed with the PVA. Extruders are devices which have been designed to handle highly viscose loads. Various kinds of extruders are commercially available and well known in the art. Common names for such a melt extruder include screw extruder, extruder-reactor, or extruder. Examples of suitable commercially available extruders include single screw extruders, twin screw extruders and multi-screw extruder. Preferably, the method is carried out in a twin-screw extruder, which brings to advantages of more uniform shearing, larger conveying capacity of screw, and more stable extrusion. More preferably, the method according to the invention is carried out in a co-rotating twin-screw extruder to achieve better mixing. The use of a melt state reaction in a suitable reactor such as an extruder is a considerable advantage over known methods, such as water bases synthesis, wherein large amounts of water, up to several thousand kilograms, need to be used and removed, for example by evaporation. A melt state reaction, in contrast can be done in large volumes with a compact device, in a short span of time which enables centralized production and easy distribution of solid, water soluble reaction product to paper manufacturing sites all over the world.

When a twin-screw extruder is used, thermoplastic poly(vinyl alcohol) PVA1 which has been dried may be fed into the barrel of the extruder, for example from a hopper, such that the thermoplastic poly(vinyl alcohol) PVA1 is gradually melted by heating HT1 source arranged along the barrel. The reagent RGT1 may be fed from the same source, or from another source, such as another hopper or side feeder unit or liquid feeding unit, in which case the thermoplastic poly(vinyl alcohol) PVA1 may be admixed AD1 with the reagent RGT1 before heating HT1. When the reagent RGT1 is fed from another source downstream of the barrel of the extruder, the thermoplastic poly(vinyl alcohol) PVA1 may be heated HT1 at least partially to a melt state, prior to admixing AD1 the reagent RGT1. The latter case is more preferable, as more friction may be provided which facilitates homogenous melting of the material into molten thermoplastic poly(vinyl alcohol) PVA1.

Reference is made to FIGS. 2a and 2b, which illustrate optional features in a method for manufacturing thermoplastic poly(vinyl alcohol) derivative in a melt state reaction. If desired, an inhibitor IHB1 may be used to inhibit spontaneous radical polymerization of vinyl groups and/or to inhibit a cross-linking reaction of the thermoplastic poly(vinyl alcohol) PVA1 and/or its derivative CMP1; CPM2; CMP3. An example of such an inhibitor IHB1 is butylated hydroxytoluene, which can act as a free radical scavenger that suppresses radical reactions, such as polymerization and cross-linking The inhibitor IHB1 may be added before the mixing MR1 or during the mixing MR1, i.e. before the ester bond forming condensation reaction or during the ester bond forming condensation reaction. The inhibitor IHB1, when used, is typically added in minor amounts, such as in an amount of equal or less than 0.2 wt.-% of the total weight of the mixture MXT1.

Further, if desired, a homogeneous or heterogeneous catalyst CAT1 may be used to accelerate the ester bond forming condensation reaction. A suitable catalyst CAT1 may be, for example, a Brønsted acid (e.g. sulfuric acid), a Lewis acid (e.g. tin(II) octoate), or a Brønsted/Lewis base (e.g. alkaline metal alkoxide or carbonate). Further, pyridine may be used as such a catalyst. A preferred catalyst CAT1 is 1-methylimidazole, which has a high catalytic activity, which is in the range of $4 \times 10^2$ times higher than the catalytic activity of pyridine. The catalyst CAT1 may be added before the mixing MR1 or during the mixing MR1, i.e. before the ester bond forming condensation reaction or during the ester bond forming condensation reaction. The catalyst CAT1, when used, is typically added in minor amounts, such as in an amount of equal or less than 0.5 wt.-% of the total weight of the mixture MXT1.

The ester bond forming condensation reaction in a melt state of organic acid anhydride AH1; AH2; AH3; AH4; AH5 and thermoplastic poly(vinyl alcohol) PVA1 that contains hydroxyl groups yields a reaction product PROD1, which contains thermoplastic poly(vinyl alcohol) derivative CMP1; CMP2; CMP3 and carboxylic acid residue RD1; RD2; RD3 of the ester bond forming condensation reaction, as illustrated in FIGS. 7 to 9.

Reference is made to FIG. 7. When providing heat A to a mixture which contains a thermoplastic poly(vinyl alcohol) PVA1 and an organic anhydride AH1 such that the temperature of the mixture is above the melting point of the mixture, an ester bond forming condensation reaction in a melt state begins to occur. During the condensation reaction, one of the two acyl groups of the organic acid anhydride AH1 forms an ester bond with a hydroxyl group of the thermoplastic poly(vinyl alcohol) PVA, thereby forming thermoplastic poly(vinyl alcohol) derivative CMP1, while the other acyl group becomes a carboxylic acid residue RD1. The condensation reaction of the organic anhydride AH1 in a melt state is unselective, such that either of the acyl groups may participate in the ester bond forming reaction. Each of the acyl groups contains a functional group, denoted with symbols $R^2$ and $R^1$. The ester bond forming condensation reaction thereby results into the thermoplastic poly(vinyl alcohol) derivative CMP1 containing ester bonded pendant chains which comprise functional groups $R^1$ and $R^2$. The ester bond forming condensation reaction further results into the carboxylic acid residue RD1 containing the functional groups $R^1$ and $R^2$. When at least one of the functional groups $R^1$; $R^2$ has a chain that ends into a vinyl group, the same functional groups $R^1$; $R^2$ present both in the thermoplastic poly(vinyl alcohol) derivative CMP1 and the carboxylic acid residue RD1.

With further reference to FIG. 7, an ester bond forming condensation reaction between the molten thermoplastic poly(vinyl alcohol) PVA1 and asymmetrical organic acid anhydride AH1, without adding a solvent, results to a reaction product PROD1 containing carboxylic acid residue RD1 and thermoplastic poly(vinyl alcohol) derivative CMP1. Since at least one of the functional groups $R^1$ and $R^2$ has chains that end into vinyl groups, at least some of the resulting carboxylic acid residue RD1 contains chains end into vinyl groups, and at least some of the thermoplastic poly(vinyl alcohol) derivative CMP1 contains ester bond pendant chains that end into vinyl groups. Statistically, it is equally likely for either or the acyl groups of the anhydride to participate in the ester bond forming condensation reaction. Thus, the carboxylic acid residue RD1; RD2; RD3 is an organic compound contains the same kind of catenated carbon structure of at least 4 carbon atoms that end into vinyl group, as the ester bonded pendant chains of the thermoplastic poly(vinyl alcohol) derivative CMP1; CMP2; CMP3. In addition, with reference to FIG. 6, when an asymmetrical organic acid anhydride AH1; AH3; AH5 reacts in an ester bonding condensation reaction, it is equally likely for either of the acyl groups to become the ester bonded pendant chain of the thermoplastic poly(vinyl alcohol) derivative CMP1; CMP2; CMP3. A benefit of using a symmetrical anhydride AH2; AH4, therefore, is in obtaining thermoplastic poly(vinyl alcohol) derivative CMP1; CMP2 which may contain a higher amount of ester bond pendant chains that end into vinyl groups, than thermoplastic poly(vinyl alcohol) derivative CMP3, wherein an asymmetrical anhydride AH1; AH3; AH5 is used, unless both of the acyl groups in the asymmetrical anhydride end into a vinyl group. This is illustrated in FIG. 9, where an ester bond forming condensation reaction in a melt state between molten thermoplastic poly(vinyl alcohol) PVA1 and acetylundecenoyl anhydride AH5, which is an asymmetrical organic acid anhydride, leads to a reaction product PROD1 that containing carboxylic acid residue RD3 and thermoplastic poly(vinyl alcohol) derivative CMP3. While not illustrated in FIG. 9, a condensation reaction of the acetylundecenoyl anhydride AH5 with a hydroxyl group of the thermoplastic poly(vinyl alcohol) is non-selective. Therefore, the carboxylic acid residue RD3 contains both acetic acid as well as 10-undecenoic acid, which ends into a vinyl group. Similarly, with reference to FIG. 8, an ester bond forming condensation reaction in a melt state between molten thermoplastic poly(vinyl alcohol) PVA1 and undecenoyl anhydride AH4, which is a symmetrical organic acid anhydride, results a reaction product PROD1 containing carboxylic acid residue RD2 and thermoplastic poly(vinyl alcohol) derivative CMP2. However, since both of the acyl groups of the undecenoyl anhydride AH4 have linear chains that end into vinyl groups, the resulting carboxylic acid residue RD2 contains only linear chains end into vinyl groups, and the thermoplastic poly(vinyl alcohol) derivative CMP2 contains ester bonded pendant chains that end into vinyl groups.

The reagent RGT1 may be admixed AD1 with the thermoplastic poly(vinyl alcohol) PVA1 in an amount in the range of 1 to 10 wt.-%, more preferably in the range of 3 to 6 wt.-% when determined of the total weight of the mixture MXT1. A higher amount of the reagent RGT1 may decrease the melt viscosity of the mixture to a level, which complicates the operation of the reactor, in particular, when the reactor is an extruder.

Reference is made to FIG. 6. The reagent RGT1 may comprise one or more organic acid anhydrides, which may be different. The organic acid anhydride AH1; AH2; AH3; AH4; AH5 may be a fatty acid-based anhydride. A fatty acid based anhydride, as referred herein, comprises at least one chain which has a catenated carbon structure of at least 4 carbon atoms that ends into a vinyl group. The organic acid anhydride may be symmetrical or asymmetrical anhydride. The fatty acid-based anhydrides may contain one acyl group or two acyl groups derived from 3-butenoic acid, 2,2'-dimethyl-4-pentenoic acid, 4-pentenoic acid, 7-ocenoic acid, 8-nonenoic acid, 10-undecenoic acid, or 12-tridecenoic acid. A symmetrical fatty acid-based anhydride may be derived from a single fatty acid. An asymmetrical fatty acid-based anhydride may be derived from two or more fatty acids, which are different. The organic acid anhydride may be, for example, acetylundecenoyl anhydride AH5, which is an asymmetrical anhydride comprising one acyl group having a vinyl group, wherein the acyl group has been derived from 10-undecenoic acid. Alternatively, or in addition, the organic acid anhydride may be undecenoyl anhydride AH4, which is a symmetrical anhydride comprising two identical acyl groups, each having a vinyl group at the end wherein both acyl groups are derived from 10-undecenoic acid, or 4-pentenoic octanoic anhydride AH3 wherein one acyl group is derived from 4-pentenoic acid.

With reference to FIG. 2a and FIG. 2b, after the reaction product PROD1 is formed, it may be extruded EX1, for example through a die. The extrudate may be cooled, preferably by means of air or inert gas flow, such that the temperature of the reaction product decreases and a solid reaction product OBJ1 is obtained. Air cooling may be used to control the decrease rate of the temperature of the reaction product PROD1. When the decrease rate of the temperature of the reaction product PROD1 is small, the reaction product PROD1 may be configured to remain a longer time in a temperature above the melting point of the mixture MXT1. This enables an extended time for the condensation reaction, which may increase the yield of the reaction product. Alternatively, the cooling may be performed, for example, as a water bath cooling. The solid reaction product OBJ1 may then be shaped into compact form which is suitable for transportation, such as pellets, granulates or powder.

The method thus enables an efficient and an elegant way of producing solid reaction product by a melt state reaction, where separation and/or purification of the reaction product is not needed. The solid reaction product is easy to shape into granulate or powder form for transportation. The solid reaction product may be later dissolved into water, for example when used for preparing a coating composition.

Recycling of the Acidic Residue to Reagent

With reference to FIG. 2a and FIG. 2b, optionally, at least part of the carboxylic acid residue RD1; RD2; RD3 from the reaction product PROD1 during and/or after the ester bond forming condensation reaction may be removed, for example by means of evaporation. Thereby recyclable carboxylic acid residue RRD1 may be obtained. The carboxylic acid residue may evaporate away while the reaction product is being extruded. The vapor containing the evaporated carboxylic acid residue may be collected and condensed into liquid state for recycling. For the purpose of recycling, the recyclable carboxylic acid residue RRD1 may be arranged to participate into a reaction wherein organic acid anhydride AH1; AH2; AH3; AH4; AH5 having at least a chain which has a catenated carbon structure of at least 4 carbon atoms and which ends into a vinyl group is formed, thereby forming reagent RGT1 of the recyclable carboxylic acid residue RRD1. Therefore, recycling of at least part of the carboxylic acid residue RD1; RD2; RD3 may be enabled. The possibility of recycling the chemical may be used to further reduce the costs of the manufacturing procedure. Recycling also is a sustainable way of providing reagent to the method for manufacturing thermoplastic poly(vinyl alcohol) derivative.

Figure 3A:
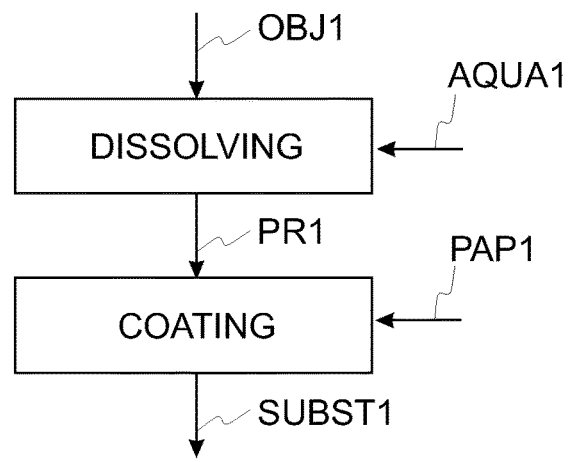
FIGS. 3a and 3b illustrate, by way of examples, a method for manufacturing a paper substrate which is suitable for binding silicone in a catalytic hydrosilation reaction
Figure 3B:
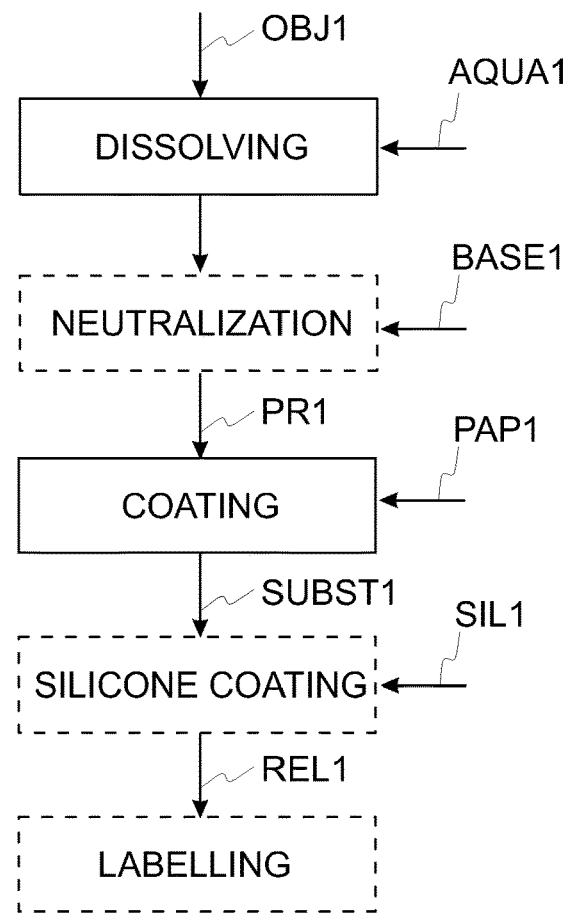

With reference to FIG. 3b, optionally, the method may further comprise neutralizing at least some of the carboxylic acid residue RD1; RD2; RD3 of the reaction product with an alkaline reagent BASE1, such as NaOH, thereby forming a salt of the carboxylic acid residue. The neutralization may also be performed with other reagent which contain sodium, when the pH of the reagent is higher than the pH of the reaction product PROD1 or the reaction product in a solid form OBJ1, or an aqueous solution PR1 formed of the solid reaction product OBJ1. The carboxylic acid residue RD1; RD2; RD3 is usually a carboxylic acid with weaker acidity, compared to the hydrogen halide produced according to the known methods. Neutralization would make the reaction product to be even less harmful. According to the invention, the salt content is less as compared with above-identified known methods in the prior art.

The Reaction Product

A melt state reaction of thermoplastic poly(vinyl alcohol) PVA1 having hydroxyl groups and organic acid anhydride AH1; AH2; AH3; AH4; AH5 which contains chains which end into vinyl groups, as disclosed above, may be arranged to provide a solid reaction product OBJ1 that comprises thermoplastic poly(vinyl alcohol) derivative CMP1; CMP2; CMP3 and carboxylic acid residue RD1; RD2; RD3. Due to the non-selective ester bond forming condensation reaction in a melt state, both the thermoplastic poly(vinyl alcohol) derivative CMP1; CMP2; CMP3 and the carboxylic acid residue RD1; RD2; RD3 may comprise the same kind of catenated carbon structures of at least 4 carbon atoms that end into vinyl group. More specifically, the solid reaction product OBJ1 contains thermoplastic poly(vinyl alcohol) derivative CMP1; CMP2; CMP3 comprising ester bonded pendant chains of which at least some end into vinyl groups, wherein the pendant chains which end into vinyl groups contain a catenated carbon structure of at least 4 carbon atoms. The solid reaction product OBJ1 further comprises carboxylic acid residue RD1; RD2; RD3, wherein carboxylic acid residue RD1; RD2; RD3 is an organic compound that also contains the same kind of catenated carbon structures of at least 4 carbon atoms that end into vinyl group as the pendant chains of the thermoplastic poly(vinyl alcohol) derivative CMP1; CMP2; CMP3. The amount of the thermoplastic poly(vinyl alcohol) derivative CMP1; CMP2; CMP3 may be in a range of 80.0-99.9 wt.-% of the solid reaction product OBJ1. The melting temperature of the solid reaction product OBJ1 may be in a range of 170 to 210° C. The solid reaction product OBJ1 may be treated with a neutralizing agent, such as NaOH. Therefore, at least some of the carboxylic acid residue RD1; RD2; RD3 may be in the form of carboxylate. The solid reaction product may be dissolved into water and diluted to desired/needed concentrations for versatile applications. The solid reaction product OBJ1 may be used to form an aqueous solution, which may be used as a coating composition. The solid reaction product OBJ1 may be used to form a coating composition which contains thermoplastic poly(vinyl alcohol) derivative CMP1; CMP2; CMP3 comprising ester bonded pendant chains of which at least some end into vinyl groups, wherein the pendant chains which end into vinyl groups contain a catenated carbon structure of at least 4 carbon atoms, which may also contain carboxylic acid residue RD1; RD2; RD3. When mixed with other coating composition substances, the solid reaction product may be used as part of a coating composition.

The thermoplastic poly(vinyl alcohol) derivative contained in the reaction product may have a degree of hydrolysis in the range of 60% to 90%. The thermoplastic poly(vinyl alcohol) derivative contained in the reaction product may further have a melt flow index in a range of 0.5-300 g/10 min. The melt flow index may be determined according to standard ISO 1133 (210° C., 2.16 kg) with a melt point measuring device, or alternatively by using a differential scanning calorimetry method.

The thermoplastic poly(vinyl alcohol) derivative contained in the reaction product may further contains a vinyl group molality $b_{vin}$ which is equal to or higher than 0.01, preferably equal to or higher than 0.03 millimoles per gram of the thermoplastic poly(vinyl alcohol) derivative. The vinyl group molality $b_{vin}$ may be determined from a known amount of solid reaction product by first separating the carboxylic acid residue and the thermoplastic poly(vinyl alcohol) derivative into two separate phases by means of heptane extraction, thereby forming two separate samples. The amount of vinyl groups may then be determined from the two separate samples. The vinyl group molality $b_{vin}$ of the thermoplastic poly(vinyl alcohol) derivative may be determined, for example, by dissolving thermoplastic poly (vinyl alcohol) into water and using an iodometric titration method following the standard ISO 3961:2009(E). The vinyl group molality $b_{vin}$ of the carboxylic acid residue may be determined, for example, from the heptane by using the iodometric titration method following the standard ISO 3961:2009(E) or by means of a gas chromatography method. The gas chromatography may be performed, for example, with HeadSpace-GC-MDS equipment, wherein a substance may be detected by its specific retention time, i.e. the time needed for this specific substance to flow through the separation column of the gas chromatography device.

The carboxylic acid residue RD1; RD2; RD3 and/or a salt of said carboxylic acid residue may be present up to half the amount of the added reagent RGT1. The carboxylic acid residue may be in an amount of up to 5 wt.-%, or up to 3 wt.-%, when determined of the total weight of the reaction product PROD1 or the solid reaction product OBJ1. Preferably, the salt of said carboxylic acid residue may be present in an amount of equal to or less than 1 wt.-%, more preferably in an amount of equal to or less than 0.5 wt.-%, and most preferably in an amount of equal to or less than 0.1 wt.-%.

A Method for Manufacturing a Paper Substrate which is Suitable for Binding Silicone in a Catalytic Hydrosilation Reaction and Product Thereof Reference is made to FIGS. 3a, 3b, 4 and 5. A paper substrate SUBST1 which is suitable for binding silicone SIL1 in a catalytic hydrosilation reaction, may be obtained by providing a cellulose fiber-based support layer PAP1 and coating the cellulose fiber-based support layer PAP1 with coating composition that contains the reaction product PROD1 containing the thermoplastic poly(vinyl alcohol) derivative CMP1; CMP2; CMP3 and carboxylic acid residue RD1; RD2; RD3, such that a primer layer PRIM1 is formed, thereby obtaining the paper substrate SUBST1. The cellulose fiber-based support layer PAP1 may be alternatively coated with coating composition that has been formed of the solid reaction product OBJ1, for example by dissolving the solid reaction product OBJ1 into water AQUA1, thereby forming an aqueous solution PR1 containing the thermoplastic poly(vinyl alcohol) derivative CMP1; CMP2; CMP3 and carboxylic acid residue RD1.

The coating composition containing the reaction product PROD1 or the aqueous solution PR1 containing the thermoplastic poly(vinyl alcohol) derivative CMP1; CMP2; CMP3 and carboxylic acid residue RD1; RD2; RD3 may be applied on the cellulose fiber-based support layer PAP1 by conventional paper coating methods. A cellulose fiber-based support layer coated with a primer layer PRIM1 containing thermoplastic poly(vinyl alcohol) derivative CMP1; CMP2; CMP3 and carboxylic acid residue RD1; RD2; RD3 provides an unprecedented means of improving the release characteristics of a subsequent release layer applicable on top of the primer layer, in particular when fast curing silicone compounds are used.

Reference is made to FIGS. 3a and 3b. The solid reaction product OBJ1, containing the thermoplastic poly(vinyl alcohol) derivative CMP1; CMP2; CMP3 and carboxylic acid residue RD1; RD2; RD3, may be dissolved with water AQUA1, thereby forming an aqueous solution PR1. The aqueous solution PR1 may be coated on at least one side of a cellulose fiber-based support layer PAP1, thereby forming a paper substrate SUBST1 with a primer layer PRIM1 that contains thermoplastic poly(vinyl alcohol) derivative CMP1; CMP2; CMP3 which contains ester bonded pendant chains of which at least some end into vinyl groups, wherein the pendant chains which end into vinyl groups contain a catenated carbon structure of at least 4 carbon atoms, the primer layer PRIM1 further comprising carboxylic acid residue RD1; RD2; RD3.

If desired, an alkaline reagent BASE1, such as NaOH, may be added to the aqueous solution PR1, thereby performing a neutralization, wherein at least at least some of the carboxylic acid residue RD1; RD2; RD3 reacts with the alkaline reagent BASE1, such that corresponding carboxylate is formed. The aqueous solution PR1 may be then applied on the cellulose fiber-based support layer PAP1, such that a paper substrate SUBST1 is formed.

A Paper Substrate

Figure 4:
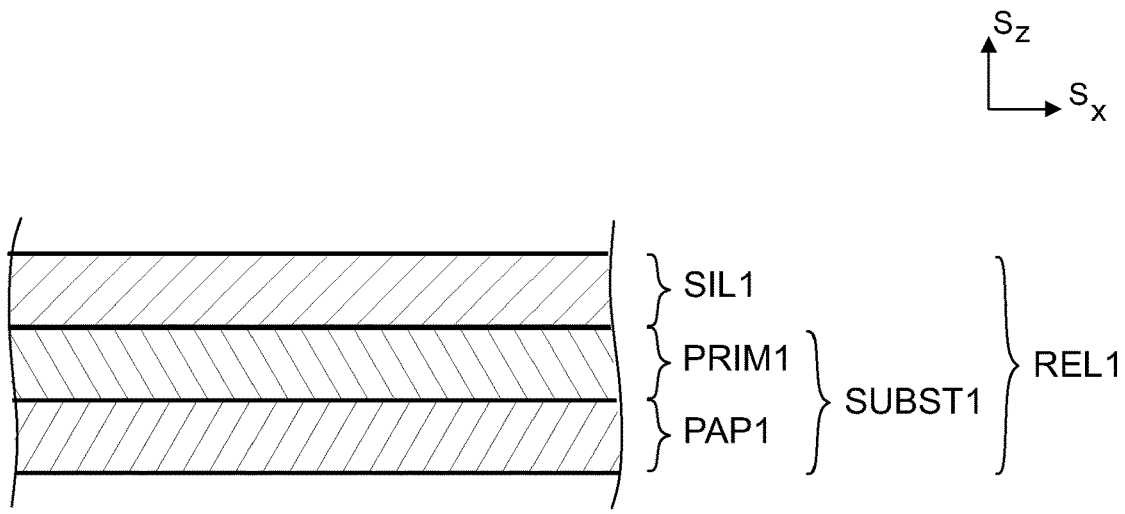
FIG. 4 illustrates, by way of an example, a cross-dimensional view of a release liner comprising a paper substrate and a release layer.
Figure 5:
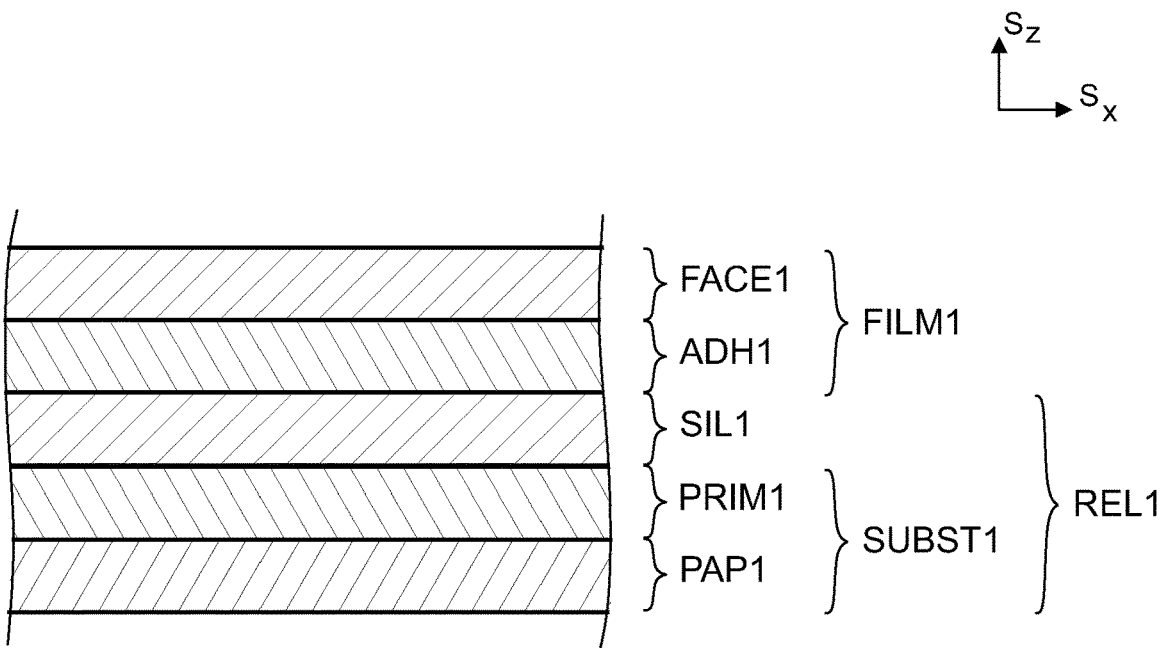
FIG. 5 illustrates, by way of an example, a cross-dimensional view of a label laminate web manufactured on a release liner.

Reference is made to FIGS. 4 and 5. A paper substrate SUBST1, as used herein, is a paper suitable for use as a layer of a release liner. A paper suitable for use as a layer of a release liner refers to a finished cellulose fiber based support layer which has been manufactured on a paper machine and coated with a primer layer. The finishing of the cellulose fiber based support layer PAP1 can be done by surface sizing and calendaring treatment. The surface sizing and calendaring treatment improve the smoothness of the paper surface. A surface sizing refers to a sizing layer, which may be applied on the surface of the cellulose fiber based support layer PAP1. Surface sizing and calendaring treatment may also be used to reduce the thickness of the paper and to reduce the porosity of the paper surface. The calendaring treatment may be done on the formed paper substrate SUBST1 before or after applying a primer layer. The calendaring treatment may comprise use of a calender, a multi-nip calender and/or a super calender to modify the surface properties of the paper and/or to reach a final thickness for the paper. In release liner manufacturing, paper quality and suitability for coating with a silicon polymer based compound (i.e. release coating) may be determined based on the smoothness, density, porosity and transparency of the paper. Bekk method may be used for determining the smoothness and/or porosity of paper for release liner. For the Bekk method, ISO 5627 standard may be used. Gurley method may be used for determining the air permeability of paper. For the Gurley method, ISO 5636-5:2013 standard may be used.

Other characteristics typical for a paper suitable for release liner are smoothness of at least 900 sec/min (ISO 5627), density of at least 1.0, such as in the range of 1.0 to 1.2, wherein the density refers to grammage (ISO 536) per thickness (ISO 534), porosity equal to or less than 15000 pm/Pas (ISO 11004) and transparency of equal to or higher than 40%, preferably equal to or higher than 44% when the paper grammage is less than 70 g/m$^2$, or equal to or higher than 28%, preferably equal to or higher than 33% when the paper grammage is equal to or higher than 70 g/m$^2$ (ISO 2470), the parameter values corresponding to ISO standards referred in parentheses. In practice, paper types lending themselves for release liner applications are vegetable parchment, greaseproof paper, coated papers and glassine.

Of these, glassine is preferred for industrial manufacturing of high quality release liner, due to the mechanical properties of the paper obtained in the manufacturing process.

Vegetable parchment paper is a paper typically made of waterleaf sheet (unsized sheet of paper, made from chemical wood pulp) by treating it in a bath of sulfuric acid. The treated paper is washed thoroughly to remove the acid and then dried. This chemical treatment forms a very tough, stiff paper with an appearance similar to a genuine parchment. However, paper treated in this manner has a tendency to become brittle and to wrinkle upon drying.

Vegetable parchment is therefore often treated with a plasticizing agent, such as glycerine or glucose.

Coated papers comprise variety of papers, having in common a coating layer applied on the paper surface and then calendered to modify the surface properties of the product. Coated paper which may be used as release liner is typically wood free coated paper, made of chemical pulp, such as Kraft pulp. A coat weight in the range of 5 to 12 g/m$^2$ per side is generally used. The coating layer typically comprises pigments, such as calcium carbonate and/or kaolin and binders, such as starch, polyvinyl alcohol and/or latex.

Glassine is widely used in release liner for self-adhesive materials. Glassine is paper typically made of bleached chemical pulp, having a grammage in the range of 30 to 160 g/m$^2$. Glassine used for manufacturing a release liner is coated with a primer layer which is compatible with a silicone polymer based release coating. A primer layer coating in the range of 1 to 10 g/m$^2$ per side, typically in the range of 2 to 5 g/m$^2$ per side, is used. A mixture used to form a primer layer for glassine may comprise water soluble binders such as starch, polyvinyl alcohol and/or carboxymethyl cellulose. When producing glassine paper, the pulp is refined to obtain a fiber fineness, which enables a dense, nearly unporous, paper surface to be obtained. Such a surface is resistant to air and liquids such as oil and water. When manufacturing glassine paper, the pulp slurry is first refined to a high level, the formed paper web is then pressed and dried, and a primer layer coating is applied on the paper web surface. Glassine is calendered with a multi-nip calender or a supercalender before or after applying the primer layer, to obtain a product having high density surface, high impact strength, high tear resistance and transparency. Glassine, however, has a lower dimensional stability than a conventional coated paper. Therefore, shrinkage of the formed fiber web when manufacturing glassine paper is higher than with conventional coated paper.

Greaseproof paper is similar to glassine in grammage. The main difference between greaseproof paper and glassine is in the calendaring treatment. While glassine is typically supercalendered, greaseproof paper is not. Hence, greaseproof paper has a diminished tearing resistance when compared to glassine.

With reference to FIG. 5, the paper substrate SUBST1 serves as a platform for a subsequent release coating, typically a silicone-based composition, which is applied on the paper substrate SUBST1 in oily form, which release coating is then cured to form the release layer SIL1. Products such as self-adhesive labels may thereafter be manufactured by coating the release layer SIL1 of the formed release liner REL1 with an adhesive, thereby forming an adhesive layer ADH1 and subsequently adjoining a face material FACE1, which serves as a printable surface, on the adhesive layer ADH1 surface, thereby forming a label laminate web FILM1.

A primer layer PRIM1 in this context refers to a polymer containing layer coated on a cellulose fiber-based support layer PAP1. A cellulose fiber-based support layer PAP1 may contain one or more primer layers PRIM1. The primer layer PRIM1 may be applied as a coating composition on the cellulose fiber-based support layer PAP1 surface, when manufacturing the paper substrate SUBST1. The reaction product PROD1 may be applied to the cellulose fiber-based support layer PAP1 as aqueous solution PR1 formed of the solid reaction product OBJ1. When the primer layer PRIM1 contains the reaction product PROD1, the primer layer PRIM1 may be used for improving the bonding strength between the paper substrate SUBST1 and the release layer SIL1 and/or optimizing the release value of the release layer. A primer layer PRIM1 that contains the reaction product PROD1 may in particular be used to firmly anchor the release layer to the paper substrate SUBST1, such that the release liner REL1 may serve as a reliable dehesive platform in high-speed applications.

When the primer layer PRIM1 contains the reaction product PROD1, a ratio of the amount of vinyl groups in the carboxylic acid residue RD1; RD2; RD3 to the amount of vinyl groups in the thermoplastic poly(vinyl alcohol) derivative CMP1; CMP2; CMP3 may be determined. The ratio may be in the range of 0.2 to 1. The ratio may be determined from a sample of a primer layer PRIM1 by first dissolving the sample into distilled water and then separating the carboxylic acid residue RD1; RD2; RD3 and the thermoplastic poly(vinyl alcohol) derivative CMP1; CMP2; CMP3 into two separate phases by means of heptane extraction, thereby forming a first phase which contains the carboxylic acid residue RD1; RD2; RD3 dissolved in heptane and a second phase which contains the thermoplastic poly(vinyl alcohol) derivative dissolved in distilled water. The amount of vinyl groups may then be determined separately from each of the two samples in separate phases. The amount of vinyl groups in the carboxylic acid residue may be measured after evaporation of the heptane by means of gas chromatography. The amount of vinyl groups in the thermoplastic poly(vinyl alcohol) derivative in water may be determined by iodometric titration method following the standard ISO 3961:2009(E).

The primer layer PRIM1 of a paper substrate SUBST1 which contains the reaction product PROD1, contains thermoplastic poly(vinyl alcohol) derivative PVA1 having a degree of hydrolysis in the range of 60 to 90 mol-%. The thermoplastic poly(vinyl alcohol) derivative PVA1 therefore promotes hydrophilicity of the primer layer PRIM1. The carboxylic acid residue RD1; RD2; RD3 part, however, tends to be less water soluble and have a more hydrophobic nature. This is particularly the case, when the carboxylic acid residue RD1; RD2; RD3 is based on a fatty acid. The carboxylic acid residue RD1; RD2; RD3 may therefore act as a surfactant, when applied on a primer layer with the thermoplastic poly(vinyl alcohol) derivative PVA1. The carboxylic acid residue RD1; RD2; RD3 may thus be configured to reduce the surface area of the primer layer PRIM1 which is exposed to water. The carboxylic acid residue RD1; RD2; RD3, once present in the primer layer, may further be arranged to decrease the entropy of the primer layer surface.

As the carboxylic acid RD1; RD2; RD3 has not bonded covalently with the thermoplastic poly(vinyl alcohol) derivative CMP1; CMP2; CMP3, the carboxylic acid RD1; RD2; RD3 has more freedom to move in a direction parallel to the surface plane of the primer layer PRIM1, which may improve the flow characteristics of the silicone based release coating SIL1 when it is applied on the primer layer. Thereby, a more homogeneous spreading of the silicone based release coating SIL1 may be obtained over the primer layer PRIM1. In other words, the silicone based release coating SIL1 may be more evenly distributed over the primer layer PRIM1.

Hence, a coating composition that contains the reaction product PROD1, the aqueous solution PR1 or the solid reaction product OBJ1 enables forming a paper substrate SUBST1 with a primer layer PRIM1 that contains thermoplastic poly(vinyl alcohol) derivative CMP1; CMP2; CMP3 which contains ester bonded pendant chains of which at least some end into vinyl groups, wherein the pendant chains which end into vinyl groups contain a catenated carbon structure of at least 4 carbon atoms. The thermoplastic poly(vinyl alcohol) derivative therefore has the capability to improve the anchorage of a subsequent silicon based release coating SILL The carboxylic acid residue RD1; RD2; RD3 also present in the reaction product PROD1, the aqueous solution PR1 or the solid reaction product OBJ1 has a further effect of improve the flow characteristics of the silicone based release coating SIL1.

A primer layer PRIM1 formed of the reaction product PROD1, the aqueous solution PR1 or the solid reaction product OBJ1 thus enables even distribution of thermoplastic poly(vinyl alcohol) derivative CMP1; CMP2; CMP3 on the surface and improves the surface characteristic of the paper substrate SUBST1. Therefore, vinyl group-containing carboxylic acid residue RD1; RD2; RD3 obtainable from an ester bond forming condensation reaction between an organic acid anhydride AH1; AH2; AH3; AH4; AH5 and a thermoplastic poly(vinyl alcohol) PVA1 having hydroxyl groups may be used as surfactant on a paper substrate SUBST1.

Experimental Examples and Comparative Examples

Below are presented comparative examples C1 to C3 and examples E1 and E2. The examples E1 and E2 demonstrate how some aspects of the invention may be carried out in practise.

Example E1—Melt State Reaction of Poly(Vinyl Alcohol) with Acetylundecenoyl Anhydride An experimental study was carried out, wherein a mixture containing thermoplastic poly(vinyl alcohol) and acetylundecenoyl anhydride was arranged to react in an ester bond forming condensation reaction in melt state such that reaction product containing thermoplastic poly(vinyl alcohol) derivative and carboxylic acid residue was obtained. Acetylundecenoyl anhydride is an asymmetrical anhydride comprising one acyl group derivable from 10-undecenoic acid having a vinyl group at the end; the other acyl group being derivable from acetic acid. Acetylundecenoyl anhydride therefore has one chain which has a catenated carbon structure and which ends into a vinyl group. The amount of acetylundecenoyl anhydride that was admixed with the thermoplastic poly(vinyl alcohol) was 5 wt.-%, determined of the total weight of the mixture. The reaction was manufactured on a conical twin-screw extruder (Brabender®, counter-rotating, 32 mm screw diameter, 330.7 mm screw length) which contained a feeding unit, three heating zones and a die zone for extruding the material.

In the experimental study, an amount of 1.9 kg of thermoplastic poly(vinyl alcohol) (Kuraray POVAL® 3-80 grade) having a degree of hydrolysis of 80 mol-% was first dried in an oven at a temperature of 60° C. for 24 hours, thereby obtaining dry thermoplastic poly(vinyl alcohol). The dry thermoplastic poly(vinyl alcohol) was then fed via the feeding unit to the extruder, together with 0.1 kg of acetylundecenoyl anhydride. A screw-speed of 30 rpm was used for mixing the mixture. The three heating zones were adjusted to have a non-decreasing temperature profile that provided smooth runnability. The first heating zone adjacent to the feeding unit had a temperature of 190° C., the second heating zone had a temperature of 190° C., as well, and the third heating zone had a temperature 195° C. The die zone next to the third heating zone was set to have a temperature of 200° C. Thus, a 5° C. temperature increase between the second and the third zones, as well as between the third zone and the die zone, was used. The temperature profile and screw geometry were further selected such that the melting point temperature of the mixture was reached already at the first zone. With the selected screw-speed and the screw geometry, the duration of the reaction in a melt state was less than 5 minutes. Thus, the acetylundecenoyl anhydride was reacted in an ester bond forming condensation reaction with the thermoplastic poly(vinyl alcohol) in a melt state. The reaction product contained 10-undecenoic acid and acetic acid as carboxylic acid residue, and thermoplastic poly(vinyl alcohol) derivative which contained ester bonded 10-undecenoic groups. The reaction product was extruded through the die zone and air cooled, such that the temperature of the reaction product decreased below the melting point of the mixture and a solid reaction product, i.e. an extrudate, was formed. The solidifying reaction product was granulated after extrusion with a thermoplastics granulator (C F SCHEER & CIE, Model D-7000 Stuttgart 30).

Example E2—Melt State Reaction of Poly(Vinyl Alcohol) with Undecenoyl Anhydride

Experiment E2 was a repeat of Example E1, wherein the 5 wt.-% of acetylundecenoyl anhydride had been replaced by the same amount of undecenoyl anhydride. Undecenoyl anhydride is a symmetrical anhydride that comprises two identical acyl groups, the acyl groups being derivable from 10-undecenoic acid. Undecenoyl anhydride therefore has two symmetrical chains, both having a catenated carbon structure which ends into a vinyl group.

When undecenoyl anhydride was reacted in an ester bond forming condensation reaction with the thermoplastic poly(vinyl alcohol) in a melt state, the reaction product contained only 10-undecenoic acid as carboxylic acid residue, in addition to thermoplastic poly(vinyl alcohol) derivative which contained ester bonded 10-undecenoic groups.

Comparative Example C1

Comparative example C1 was a repeat of Example E1, wherein the 5 wt.-% of acetylundecenoyl anhydride was replaced by the same amount of 10-undecenoic acid. 10-undecenoic acid is a carboxylic acid having a catenated carbon structure which ends into a vinyl group.

When 10-undecenoic acid was used, ester bond forming condensation reaction with the thermoplastic poly(vinyl alcohol) in a melt state was not observed. The reaction product did not contain thermoplastic poly(vinyl alcohol) derivative having covalently bonded pendant chains of which at least some end into vinyl groups.

Comparative Example C2

Comparative example C2 was a repeat of Example E1, wherein the 5 wt.-% of acetylundecenoyl anhydride was replaced by the same amount of ethyl undecenoate. Ethyl undecenoate is an ethyl ester of 10-undecenoic acid. In addition, 0.5 wt.-% of tin ethylhexanoate was added as catalyst.

When ethyl undecenoate was used, ester bond forming condensation reaction with the thermoplastic poly(vinyl alcohol) in a melt state was not observed. The reaction product did not contain thermoplastic poly(vinyl alcohol) derivative having covalently bonded pendant chains of which at least some end into vinyl groups.

Comparative Example C3

Comparative example C3 was a repeat of Example E1, wherein the 5 wt. % of acetylundecenoyl anhydride was replaced by the same amount of 10-undecenal. 10-undecenal is an aldehyde that also contains a vinyl group. In addition, 5 wt.-% of acetic acid was added as catalyst. The purpose of this comparative example was to assess the feasibility of an acetalization reaction in similar melt state conditions, as in Example E1.

When 10-undecenal was used, an acetal bond forming condensation reaction with the thermoplastic poly(vinyl alcohol) in a melt state was not observed. The results of the comparative example C3 indicated that acetalization was not feasible in the studied reaction conditions in melt state. The reaction product did not contain thermoplastic poly(vinyl alcohol) derivative having covalently bonded pendant chains of which at least some end into vinyl groups as did the anhydride based esterification reaction in melt state of example E1.

A Method to Determine Silicone Adhesion

A sample of each extruded reaction product prepared in examples E1-E2 and comparative examples C1-C3 was dissolved in water at 10% solids content. Unmodified polyvinyl alcohol (POVAL® 3-80 grade) served as a reference sample, which could be used as a negative control to determine the effect of the unmodified polyvinyl alcohol on the silicone adhesion. Anchorage is a term used in the field to describe the attachment of the release coating to the paper substrate. Anchorage may be measured as relative nib-off of the silicone from the paper substrate. A relative rub-off value of 1 refers to a perfect anchorage of the silicone, such that the release coating is fully anchored to the substrate. A relative rub-off value of 2 or 3 means that the release coating could not hold on to the paper substrate sufficiently.

Glassine paper sheets (UPM Golden, 57 g/m$^2$) were coated with the aqueous solutions using a laboratory blade coater, thereby obtaining paper substrates with a primer layer that contained either unmodified commercial polyvinyl alcohol grade without vinyl groups, modified commercial polyvinyl alcohol which has been prepared with different reagents. The amount of coating applied on each glassine paper sheet was 2 g/m$^2$. After coating, the paper substrates thus prepared were dried at 105° C. for 1 minute and conditioned at 23° C. and 50% RH (relative humidity) overnight before siliconization.

All paper substrates were subsequently subjected to siliconization, which refers to coating of a paper substrate with silicone resin prepared of Wacker Dehesive SFX 251 and V58 cross-linker, using C05 catalyst (all components provided by Wacker). The silicone resin applied on the paper substrate was prepared by stirring 87.44 parts per weight of the Dehesive SFX 251 with 10.39 parts of the V58 cross-linker for 2 minutes, then adding 2.17 part of the C05 platinum catalyst and stirring for 5 minutes. The silicone resin thus prepared was then applied on top of the paper substrate by blade coater and cured for 1 minute at 105° C., thereby curing the silicone resin into a release layer and forming a release liner. Each paper substrate was coated with an amount of 1.2 g/m$^2$ of the silicone resin thus prepared. The silicone adhesion was tested immediately after the siliconization from the formed release liner. This is referred to as the initial nib off level. To further observe the combined effect of tropical conditions and label adhesive as a function of time to the silicone adhesion level, an adhesive label with water-based glue was attached on each formed release liner immediately after siliconization and the laminates thus formed were stored at 50° C. and 75% RH for a period of 2 days, 1 week and 2 weeks before determining the silicone adhesion level again.

The level of silicone adhesion in each release liner sample was determined with a semi-automatized method, wherein the amount of silicone was measured using an x-ray fluorescence spectrometer (Oxford Lab-X-3000) before and after a defined amount of rubbing off the release liner sample. The release liner sample was placed on top of a felt, such that the siliconized surface of the release liner sample was facing the felt. The rubbing was performed by pressing the sample with constant pressure against a felt and rotating the sample 10 times around its axis, in order to increase reliability and comparability of the result. In the case of 2-day, 1-week and 2-week measurements, the release liner was tested after removing the label from the laminate. Thus the 2-day, 1-week and 2-week measurements were performed on surfaces that had been in contact with an adhesive. For each sample, 3 parallel rub-off measurements were performed, of which the arithmetic average was calculated. The results of the nib-off tests are shown in Table 1 (below). A rub-off value of 1 represents a minimum level which is considered to be acceptable. An example of a device suitable for producing rub-off on a release liner surface is a Satra nib tester, which has a rotating head holding a circular felt pad under a standard load, which enables semi-automated testing of abrasion resistance of a release layer.

TABLE 1

Silicone rub-off results.

| Sample | Rub-off | | | |
| --- | --- | --- | --- | --- |
|  | 0 days | 2 days | 1 week | 2 weeks |
| reference | 3 | 3 | 3 | 3 |
| Example E1 | 1 | 1 | 1 | 1 |
| Example E2 | 1 | 1 | 1 | 1 |
| Comp. example C1 | 3 | 3 | 3 | 3 |
| Comp. example C2 | 3 | 3 | 3 | 3 |
| Comp. example C3 | 3 | 3 | 3 | 3 |

Degree of rub-off is expressed on a scale from 1 to 3:
1 = no rub-off,
2 = visible rub-off,
3 = significant or complete rub-off.

The test results demonstrate that a primer layer comprising a thermoplastic poly(vinyl alcohol) derivative of Example E1 or E2, representing thermoplastic poly(vinyl alcohol) derivatives obtainable from an ester bond forming condensation reaction in a melt state of poly(vinyl alcohol) and organic acid anhydride, worked excellently with a modern, fast curing silicone system. The release liner samples containing a reaction product of either Example E1 or E2 presented excellent relative rub-off values, which remained consistent over time. This was not the case with the reference sample nor with the samples containing a product of comparative examples C1-C3. In view of the test results, a paper substrate containing thermoplastic poly(vinyl alcohol) derivative of an ester bond forming condensation reaction of poly(vinyl alcohol) and organic acid anhydride in a melt state demonstrated excellent silicone adhesion levels, when relative rub-off was measured. This indicated better anchorage capability for the same silicone system.

Determination of Carboxylic Acid Residue in Thermoplastic Poly(Vinyl Alcohol) Derivative by Heptane Extraction Determination Principle The presence of carboxylic acid residue may be determined from solid reaction product after the carboxylic acid residue and the thermoplastic poly(vinyl alcohol) derivative have been first separated into two separate phases, for example by means of dissolving a small amount of the solid reaction product into distilled water and performing a heptane extraction, whereby the carboxylic acid residue may be extracted into the heptane phase, since heptane is a volatile organic solvent. After having evaporated the heptane, the carboxylic acid residue is silylated and subjected to a gas chromatography analysis using a flame ionisation detector. Silylation of the carboxylic acid residue improves the thermal stability and volatility of the compound for the gas chromatography analysis.

Reagents and Materials

Indicator; 0.1% bromo cresol green in ethanol. Bromocresol green is a pH indicator that is yellow below pH 3.8 and blue over pH 5.4.

Sulphuric acid, $H_2SO_4$ (0.05 mol/l). Solvent; n-heptane.

Standard solution (0.05 mg/ml); heneicosanoic acid as internal standard, in heptane.

Silylation agents; bis-(trimethylsilyl)-trifluoro-acetamide (BSTFA) and trimethylchlorosilane (TMCS).

Sample Preparation

A 10 g amount of the reaction product from the melt state reaction of thermoplastic poly(vinyl alcohol) and organic acid anhydride is dissolved in deionised water at 10 wt.-% solids content while stirring at 90° C. to form a sample for the analysis. When high amounts of organic acid anhydride have been used in the melt state reaction, the sample may diluted further with deionized water, for example to a solids content in the range of 1 to 10 wt.-%.

Procedure

1. Pipet 5 ml of the sample into a test tube with a threaded cap.
2. Add a few drops of indicator.
3. Adjust the pH of the sample to a value close to 3 with sulphuric acid, such that the colour of the sample changes from blue-green to yellow.
4. Add 1 ml of the standard solution and 3 ml of the n-heptane solvent into the test tube.
5. Close the threaded cap of the test tube and shake vigorously for 2 minutes.
6. Centrifuge the test tube for 5 minutes at 1400 rpm (Hermle Z513, speed 1000), such that two phases are obtained: an aqueous phase containing thermoplastic poly(vinyl alcohol) derivative and an organic solvent (n-heptane) phase containing the carboxylic acid residue on top of the aqueous phase.
7. Collect the organic solvent (n-heptane) phase by pipetting it carefully into an empty test tube.
8. In case a thin emulsion layer has formed at the interface of the two phases in the test tube, leave this for a re-extraction stage.
9. Repeat the extraction (steps 4 to 8, above) with 3 ml of pure heptane and combine the extracts.
10. If necessary, repeat the extraction (steps 4 to 8, above) once more, to collect all of the organic solvent (n-heptane) phase into a combined extract.
11. Evaporate the organic solvent (n-heptane) from the combined extract with dry nitrogen gas. Place the sample tubes in a warm water bath during evaporation to facilitate the evaporation of the organic solvent (n-heptane).
12. To ensure total evaporation of the organic solvent (n-heptane), place the samples for 20 minutes into a vacuum drying oven having a temperature of 40° C., thereby obtaining dried sample.
13. Add 300 µl of the silylation agent mixture to the dried sample (50 ml BSTFA and 25 ml TMCS).
14. Silylate the dried sample at 70° C. for 30 minutes.
15. Analyse the samples in a gas chromatograph.

The gas chromatograph analysis may be performed, for example, with HeadSpace-GC-MDS equipment, wherein the silylated carboxylic acid may be detected by its specific retention time, i.e. the time needed for this specific substance to flow through the separation column of the gas chromatography device.

Determination of Reaction Product Components by Nuclear Magnetic Resonance Analysis Alternatively, or in addition, proton nuclear magnetic resonance ($^1$H-NMR) analysis may be used to identify the presence of functional groups from the chemical shift value δ. After the carboxylic acid residue and the thermoplastic poly(vinyl alcohol) derivative have been first separated into two separate phases, the presence of vinyl groups may be determined from each sample separately. Samples for the $^1$H-NMR analysis may be prepared, for example, by dissolving 1 to 10 mg of the carboxylic acid residue or the thermoplastic poly(vinyl alcohol) derivative in 1 ml of DMSO-d6 solvent and measuring standard $^1$H spectrum with 16 scans for each of the prepared NMR samples with a suitable analysis device, e.g. Broker AVANCE-series spectrometer (400 Hz). Signals typical for a vinyl group may be detected in the region between δ=4.8 to 6.0 ppm, approximately. For instance, the quantification of 10-undeceoic acid can be done by using the peak at δ=5.7 to 5.9 ppm. The methine proton adjacent to the hydroxyl group ($CH_2$—$\underline{CH}$(OH)—$CH_2$) on the backbone of the poly(vinyl alcohol) is located at δ=3.8 to 3.9 ppm and can be used as a point of reference. Molar fraction of vinyl groups per vinyl alcohol unit can be determined using the $^1$H-NMR spectrum by calculating the relative peak areas for one proton from both vinyl group and backbone of the poly(vinyl alcohol). In addition, when collecting and analyzing NMR samples prepared from solutions before and after the ester bond forming melt state reaction, the NMR results may further be used to determine the efficiency of the melt state reaction. The degree of substitution (DS) can be quantified by equation 2.

$$DS = \frac{A_1}{A_2/2} \qquad \text{Equation 2}$$

where $A_1$ is the area of the peak representing one vinyl proton and $A_2$ is the area of the peak representing one backbone proton.

Method for Determining Vinyl Group Amount from a Sample by Means of Iodometric Titration Iodometric titration in this context refers to a method based on the Wijs method according to standard ISO 3961:

2009(E) wherein a known excess of iodine monochloride is added to a sample, which results in a reaction between the iodine monochloride and any double bonds present in the sample. The quantity of iodine monochloride that has reacted with the double bonds present in the sample is determined by reacting the remaining residual iodine monochloride with a known excess of potassium iodide to form iodine, the stoichiometric quantity of which is then determined by titration with a solution of sodium thiosulphate of known concentration. From this, an iodine value of the sample is obtained that specifies the amount of iodine in grams that can formally be added to the double bonds in a known amount of the sample and from which the quantity of double bonds in the sample may then be determined. Vinyl groups are double bonds and poly(vinyl alcohol), as such, does not contain double bonds. Therefore, iodometric titration is a specific method that can be used to investigate the amount of vinyl groups present in a sample of poly(vinyl alcohol) derivative and to determine the vinyl group molality of the sample.

The iodometric titration method based on the Wijs method is may be used to measure the total number of vinyl double bonds present in a sample that has been dissolved into water or organic solvent such as n-heptane. Hence, the total number of vinyl double bonds present in a melt state reaction product, which has been produced in an ester bond forming condensation reaction of thermoplastic poly(vinyl alcohol) having hydroxyl groups and organic acid anhydride which contains chains which end into vinyl groups, may be determined separately from the carboxylic acid residue and the thermoplastic poly(vinyl alcohol) derivative, once the reaction product is processed into two separate phases by means of heptane extraction, such that two separate samples, one sample containing the carboxylic acid residue in an organic solvent that is n-heptane, the other sample containing the thermoplastic poly(vinyl alcohol) derivative in aqueous phase. Due to the phase differences, however, comparative analysis of the two iodometric titration results may not be sufficiently accurate.

The method disclosed below refers to the determination of the vinyl group amount from a sample containing only the poly(vinyl alcohol) derivative. Due to the ester bond forming condensation reaction, the poly(vinyl alcohol) derivative contains ester bonded pendant chains of which at least some end into vinyl groups.

The iodometric titration method is based on a measured volume of iodine monochloride in acetic acid (Wijs solution) which may be added to the reaction solution containing the poly(vinyl alcohol) derivative, whereby the iodine monochloride reacts according to Equation 3 (below) with the double bonds of the vinyl groups present in the poly(vinyl alcohol) derivative such that the electrophilic addition reaction produces a dihalogenated single bond, of which one carbon has bound an atom of iodine.

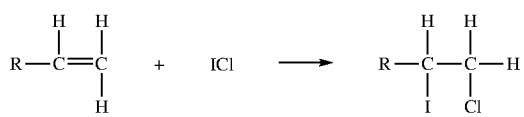

Equation 3

The iodine monochloride is a light-sensitive reagent and needs to be stored and incubated in the dark. After 1-hour incubation in the dark, the quantity of iodine that has reacted in the electrophilic addition reaction is determined by adding a measured volume of potassium iodide solution (15%, weight/volume) to the reaction solution, which causes the remaining unreacted iodine chloride in the reaction solution to form molecular iodine according to Equation 4 (below).

  Equation 4:

The liberated molecular iodine is then titrated against a standard solution of 0.1N sodium thiosulphate, whereby the stoichiometric quantity of molecular iodine may be calculated according to Equation 5 (below).

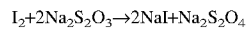  Equation 5:

The iodometric titration thus enables to determine an iodine value, which is a measure of the amount of iodine in grams that have reacted with the functional vinyl groups in a known amount of the poly(vinyl alcohol) derivative, as presented in Equation 6 (below).

$$\text{Iodine value} = \frac{(B-A) \times 12.7 \frac{g}{100\,g}}{m} \qquad \text{Equation 6}$$

where A is thiosulfate consumption in milliliters of a test sample (poly(vinyl alcohol) derivative that contains functional vinyl groups), B is thiosulfate consumption of a blank sample containing only the measured volume of iodine monochloride in acetic acid and the measured volume of potassium iodide solution, N is the normality (mol/l) of the thiosulfate solution and m is the mass in grams of the test sample (poly(vinyl alcohol) derivative that contains functional vinyl groups). When the iodometric titration method is used to compare iodine values of multiple poly(vinyl alcohol) derivative samples that contain functional vinyl groups, a sample containing only the poly(vinyl alcohol) may be used as a blank sample, instead. Blank samples containing only poly(vinyl alcohol) may also be used if the samples have been obtained from different types of thermoplastic poly(vinyl alcohol) with different degrees of hydrolysis.

The vinyl group molality $b_{vin}$ (mmol/g) can be determined according to Equation 7 (below), which equation is a simplified version obtainable from the Equation 6 (above):

$$b_{vin} = \frac{(B-A)N}{m} \qquad \text{Equation 7}$$

As an example, when the thiosulfate consumption of a 2.5 g test sample of poly(vinyl alcohol) derivative that contains functional vinyl groups in iodometric titration is 46 milliliters, the thiosulfate consumption of a blank sample is 48 milliliters and the normality of the thiosulfate solution is 0.1 mol/l, the vinyl group molality of the test sample is 0.08 mmol/g, as demonstrated below by using the formula of Equation 7:

$$\frac{(48\,ml - 46\,ml) \times 0.1\,mol/l}{2.5\,g} = 0.08 \frac{mmol}{g}$$

Below is provided an example method for measuring the quantity of vinyl groups from a dry thermoplastic poly(vinyl alcohol) derivative which contains ester bonded pendant chains, of which at least some end into vinyl groups, which thermoplastic poly(vinyl alcohol) derivative has been obtained by a melt state condensation reaction of thermoplastic poly(vinyl alcohol) with an organic acid anhydride having at least a chain which has a catenated carbon structure of at least 4 carbon atoms and which ends into a vinyl group.

The dry thermoplastic poly(vinyl alcohol) derivative may be obtained by means of heptane extraction and subsequent drying of the thermoplastic poly(vinyl alcohol) derivative from the reaction product, as disclosed above with respect to the determination of carboxylic acid residue by means of gas chromatography analysis.

The quantity of functional vinyl groups (i.e. the vinyl group molality) may then be measured by iodometric titration method, which comprises:

adding a known mass of the dry poly(vinyl alcohol) derivative that contains functional vinyl groups into distilled water such that a 10% (w/v) mixture is formed and stirring the mixture at ambient temperature or heating as necessary until a solution is obtained, thereby obtaining an aqueous solution containing the poly(vinyl alcohol) derivative that contains functional vinyl groups, collecting a 25 ml aliquot of the aqueous solution containing the poly(vinyl alcohol) derivative that contains functional vinyl groups into an empty flask adding 25 ml of iodine chloride in acetic acid (Wijs solution) into the aliquot, thereby obtaining a test sample solution adding 25 ml of iodine chloride in acetic acid (Wijs solution) into another flask containing 25 ml of distilled water, thereby obtaining a blank sample solution incubating the test sample solution and the blank sample solution in the dark for 1 h, adding 15 ml of potassium iodide solution (15%, w/v) into each of the test and blank sample solutions, respectively, while thoroughly stirring the solutions, adding starch as indicator and titrating the test and blank sample solutions with 0.1N sodium thiosulfate calculating the iodine value, which corresponds to the known mass of the dry poly(vinyl alcohol) derivative that contains functional vinyl groups, and which is directly proportional to the quantity of functional vinyl groups present in the dry poly(vinyl alcohol) derivative.

The starch indicator is added before the titration to visualize the end-point, which is observed as fading of the dark blue or purple color of the solution.

The invention claimed is:

1. A paper substrate which is suitable for binding silicone in a catalytic hydrosilation reaction, the paper substrate comprising
   a cellulose fiber-based support layer and
   a primer layer which contains thermoplastic poly(vinyl alcohol) derivative which contains ester bonded pendant chains of which at least some end into vinyl groups,
   wherein the ester bonded pendant chains that end into vinyl groups contain a catenated carbon structure of at least 4 carbon atoms, the primer layer further comprising carboxylic acid residue and/or salt of said carboxylic acid residue, and wherein the carboxylic acid residue and/or the salt of said carboxylic acid residue is an organic compound that contains the same kind of catenated carbon structure of at least 4 carbon atoms that end into vinyl group as the ester bonded pendant chains.

2. A paper substrate according to claim 1, wherein the paper substrate has
   a smoothness of at least 900 sec/min (according to ISO 5627), and/or
   a density of at least 1.0, such as in the range of 1.0 to 1.2, wherein the density refers to grammage (ISO536) per thickness (according to ISO 534), and/or
   a porosity equal to or less than 15000 pm/Pas (according to ISO 11004) and/or
   a transparency of equal to or higher than 40% (according to ISO 2470).

3. A paper substrate (SUBST1) according to claim 1 wherein the cellulose fiber-based support layer is an industrially manufactured paper substrate that has been calendered.

4. The paper substrate according to claim 3, wherein the cellulose fiber-based support layer is glassine paper, super calendared Kraft (SCK) paper or clay coated Kraft (CCK) paper.

5. A method for manufacturing a paper substrate which is suitable for binding silicone in a catalytic hydrosilation reaction, the method comprising:
   heating thermoplastic poly(vinyl alcohol) having hydroxyl groups, wherein the thermoplastic poly(vinyl alcohol) has been dried and has a degree of hydrolysis in the range of 65 to 90 mol-%, and
   admixing reagent with the thermoplastic poly(vinyl alcohol), wherein said reagent (RGT1) is an organic acid anhydride having at least a chain which has a catenated carbon structure of at least 4 carbon atoms and which ends into a vinyl group,
   such that a mixture is obtained which contains molten thermoplastic poly(vinyl alcohol) having hydroxyl groups and organic acid anhydride which contains chains which end into vinyl groups, and
   mixing the mixture at a temperature which is above the melting point of the mixture, thereby causing a reaction in a melt state, wherein at least some of the organic acid anhydride reacts with the hydroxyl groups of the thermoplastic poly(vinyl alcohol) in an ester bond forming condensation reaction,
   such that reaction product is formed which contains
   carboxylic acid residue of the ester bond forming condensation reaction, wherein at least some of said carboxylic acid residue contains chains which end into vinyl groups, and
   thermoplastic poly(vinyl alcohol) derivative, which contains ester bonded pendant chains of which at least some end into vinyl groups, and
   coating at least one side of a cellulose fiber-based support layer with a coating composition that contains the reaction product,
   thereby forming a paper substrate with a primer layer (PRIM1) that contains thermoplastic poly(vinyl alcohol) derivative which contains ester bonded pendant chains of which at least some end into vinyl groups, wherein the pendant chains which end into vinyl groups contain a catenated carbon structure of at least 4 carbon atoms, the primer layer further comprising carboxylic acid residue, wherein the carboxylic acid residue is an organic compound that contains the same kind of catenated carbon structure of at least 4 carbon atoms that end into vinyl group as the pendant chains of the thermoplastic poly(vinyl alcohol) derivative, the paper substrate thereby being suitable for binding silicone in a catalytic hydrosilation reaction.

6. The method according claim 5, further comprising neutralizing at least some of the carboxylic acid residue of the reaction product with an alkaline reagent prior to coating the cellulose fiber-based support layer, thereby forming a salt of the carboxylic acid residue, such that at least some of the carboxylic acid residue on the primer layer is in the form of a salt of said carboxylic acid residue.

* * * * *